United States Patent
Tijerina et al.

(10) Patent No.: US 10,482,407 B2
(45) Date of Patent: Nov. 19, 2019

(54) IDENTIFYING RESOURCE ALLOCATION DISCREPANCIES

(71) Applicant: Apptio, Inc., Bellevue, WA (US)

(72) Inventors: David Tijerina, Shoreline, WA (US); Venkatesh Krishnan, Sammamish, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 15/351,313

(22) Filed: Nov. 14, 2016

(65) Prior Publication Data

US 2018/0137445 A1    May 17, 2018

(51) Int. Cl.
*G06Q 10/06*    (2012.01)
*G06N 3/08*    (2006.01)

(52) U.S. Cl.
CPC ......... *G06Q 10/06313* (2013.01); *G06N 3/08* (2013.01)

(58) Field of Classification Search
USPC .............................................. 705/7.11–7.42
See application file for complete search history.

(56) References Cited

U.S. PATENT DOCUMENTS

| | | |
|---|---|---|
| 4,744,026 A | 5/1988 | Vanderbei |
| 5,249,120 A | 9/1993 | Foley |
| 5,615,121 A | 3/1997 | Babayev et al. |
| 5,721,919 A | 2/1998 | Morel et al. |
| 5,758,327 A | 5/1998 | Gardner et al. |
| 5,799,286 A | 8/1998 | Morgan et al. |
| 5,802,508 A | 9/1998 | Morgenstern |
| 5,903,453 A | 5/1999 | Stoddard, II |
| 5,970,476 A | 10/1999 | Fahey |
| 5,991,741 A | 11/1999 | Speakman et al. |

(Continued)

FOREIGN PATENT DOCUMENTS

JP    2011134268 A    7/2011

OTHER PUBLICATIONS

Selen, et al., "Model-Order Selection: A review of information criterion rules", IEEE Signal Processing Magazine, Jul. 2004, pp. 36-47. (Year: 2004).*

(Continued)

*Primary Examiner* — Amber A Misiaszek
(74) *Attorney, Agent, or Firm* — John W. Branch; Lowe Graham Jones PLLC

(57) ABSTRACT

Embodiments are directed to identifying allocation discrepancies. Data models and Benchmark models may be provided to an analysis engine. Discrepancy models may be provided to the analysis engine, such that each discrepancy model may be arranged to include one or more rules. The analysis engine may be employed to search for discrepancies in the data models based on the discrepancy models and the benchmark models. If discrepancies may be identified by the analysis engine, one or more notifications may be provided to one or more users. Also, the discrepancy models may be modified based on subsequent feedback provided by the one or more users. Correlations in the resource allocation values may be identified based on machine learning that includes one or more of linear regression, deep learning neural networks, or the like. And, additional discrepancy models may be provided based on the identified correlations.

21 Claims, 14 Drawing Sheets

(56) References Cited

U.S. PATENT DOCUMENTS

| | | |
|---|---|---|
| 6,014,640 A | 1/2000 | Bent |
| 6,032,123 A | 2/2000 | Jameson |
| 6,047,290 A | 4/2000 | Kennedy et al. |
| 6,208,993 B1 | 3/2001 | Shadmon |
| 6,249,769 B1 | 6/2001 | Ruffin et al. |
| 6,253,192 B1 | 6/2001 | Corlett et al. |
| 6,308,166 B1 | 10/2001 | Breuker et al. |
| 6,321,207 B1 | 11/2001 | Ye |
| 6,330,552 B1 | 12/2001 | Farrar et al. |
| 6,424,969 B1 | 7/2002 | Gruenwald |
| 6,507,825 B2 | 1/2003 | Suh |
| 6,578,005 B1 | 6/2003 | Lesaint et al. |
| 6,594,672 B1 | 7/2003 | Lampson et al. |
| 6,647,370 B1 | 11/2003 | Fu et al. |
| 6,738,736 B1 | 5/2004 | Bond |
| 6,789,252 B1 | 9/2004 | Burke et al. |
| 6,832,212 B1 | 12/2004 | Zenner et al. |
| 6,839,719 B2 | 1/2005 | Wallace |
| 6,877,034 B1 | 4/2005 | Machin et al. |
| 6,882,630 B1 | 4/2005 | Seaman |
| 6,965,867 B1 | 11/2005 | Jameson |
| 6,983,321 B2 | 1/2006 | Trinon et al. |
| 7,050,997 B1 | 5/2006 | Wood, Jr. |
| 7,130,822 B1 | 10/2006 | Their et al. |
| 7,149,700 B1 | 12/2006 | Munoz et al. |
| 7,177,850 B2 | 2/2007 | Argenton et al. |
| 7,263,527 B1 | 8/2007 | Malcolm |
| 7,305,491 B2 | 12/2007 | Miller et al. |
| 7,308,427 B1 | 12/2007 | Hood |
| 7,321,869 B1 | 1/2008 | Phibbs, Jr. |
| 7,386,535 B1 | 6/2008 | Kalucha et al. |
| 7,418,438 B2 | 8/2008 | Gould et al. |
| 7,505,888 B2 | 3/2009 | Legault et al. |
| 7,590,937 B2 | 9/2009 | Jacobus et al. |
| 7,634,431 B2 | 12/2009 | Stratton |
| 7,653,449 B2 | 1/2010 | Hunter et al. |
| 7,664,729 B2 | 2/2010 | Klein et al. |
| 7,703,003 B2 | 4/2010 | Payne et al. |
| 7,725,343 B2 | 5/2010 | Johanson et al. |
| 7,742,961 B2 | 6/2010 | Aaron et al. |
| 7,752,077 B2 | 7/2010 | Holden et al. |
| 7,769,654 B1 | 8/2010 | Hurewitz |
| 7,774,458 B2 | 8/2010 | Trinon et al. |
| 7,783,759 B2 | 8/2010 | Eilam et al. |
| 7,801,755 B2 | 9/2010 | Doherty et al. |
| 7,805,400 B2 | 9/2010 | Teh et al. |
| 7,813,948 B2 | 10/2010 | Ratzloff |
| 7,852,711 B1 | 12/2010 | Fitzgerald et al. |
| 7,870,051 B1 | 1/2011 | En et al. |
| 7,877,742 B2 | 1/2011 | Duale et al. |
| 7,899,235 B1 | 3/2011 | Williams et al. |
| 7,917,555 B2 | 3/2011 | Gottumukkala et al. |
| 7,930,396 B2 | 4/2011 | Trinon et al. |
| 7,933,861 B2 | 4/2011 | Zadorozhny |
| 7,945,489 B2 | 5/2011 | Weiss et al. |
| 7,966,235 B1 | 6/2011 | Capelli et al. |
| 8,010,584 B1 | 8/2011 | Craver et al. |
| 8,024,241 B2 | 9/2011 | Bailey et al. |
| 8,073,724 B2 | 12/2011 | Harthcryde et al. |
| 8,175,863 B1 | 5/2012 | Ostermeyer et al. |
| 8,195,524 B2 | 6/2012 | Sandholm et al. |
| 8,200,518 B2 | 6/2012 | Bailey et al. |
| 8,200,561 B1 | 6/2012 | Scott et al. |
| 8,209,218 B1 | 6/2012 | Basu et al. |
| 8,260,959 B2 | 9/2012 | Rudkin et al. |
| 8,370,243 B1 | 2/2013 | Cernyar |
| 8,396,775 B1 | 3/2013 | Mindlin |
| 8,423,428 B2 | 4/2013 | Grendel et al. |
| 8,484,355 B1 | 7/2013 | Lochhead et al. |
| 8,533,904 B2 | 9/2013 | Conrad |
| 8,543,438 B1 | 9/2013 | Fleiss |
| 8,600,830 B2 | 12/2013 | Hoffberg |
| 8,601,263 B1 | 12/2013 | Shankar et al. |
| 8,655,714 B2 | 2/2014 | Weir et al. |
| 8,667,385 B1 | 3/2014 | Mui et al. |
| 8,768,976 B2 | 7/2014 | McLachlan et al. |
| 8,826,230 B1 | 8/2014 | Michelsen |
| 8,935,301 B2 | 1/2015 | Chmiel et al. |
| 8,937,618 B2 | 1/2015 | Erez et al. |
| 8,970,476 B2 | 3/2015 | Chan |
| 8,996,552 B2 | 3/2015 | Mukes et al. |
| 9,015,692 B1 | 4/2015 | Clavel |
| 9,020,830 B2 | 4/2015 | Purpus et al. |
| 9,104,661 B1 | 8/2015 | Evans |
| 9,213,573 B2 | 12/2015 | French et al. |
| 9,281,012 B2 | 3/2016 | Hedges |
| 9,384,511 B1 | 7/2016 | Purpus |
| 9,529,863 B1 | 12/2016 | Gindin et al. |
| 9,805,311 B1 | 10/2017 | Mohler |
| 10,152,722 B2 | 12/2018 | Heath |
| 2002/0002557 A1 | 1/2002 | Straube et al. |
| 2002/0016752 A1 | 2/2002 | Suh |
| 2002/0056004 A1 | 5/2002 | Smith |
| 2002/0069102 A1 | 6/2002 | Veilante et al. |
| 2002/0082966 A1 | 6/2002 | O'Brien et al. |
| 2002/0087441 A1 | 7/2002 | Wagner, Jr. et al. |
| 2002/0107914 A1 | 8/2002 | Charisius et al. |
| 2002/0123945 A1 | 9/2002 | Booth et al. |
| 2002/0145040 A1 | 10/2002 | Grabski |
| 2002/0156710 A1 | 10/2002 | Ryder |
| 2002/0174006 A1 | 11/2002 | Rugge et al. |
| 2002/0178198 A1 | 11/2002 | Steele |
| 2002/0194329 A1 | 12/2002 | Alling |
| 2003/0019350 A1 | 1/2003 | Khosla |
| 2003/0074269 A1 | 4/2003 | Viswanath |
| 2003/0083388 A1 | 5/2003 | L'Alloret |
| 2003/0083888 A1 | 5/2003 | Argenton et al. |
| 2003/0083912 A1 | 5/2003 | Covington et al. |
| 2003/0093310 A1 | 5/2003 | Macrae |
| 2003/0110113 A1 | 6/2003 | Martin |
| 2003/0139960 A1 | 7/2003 | Nishikawa et al. |
| 2003/0139986 A1 | 7/2003 | Roberts, Jr. |
| 2003/0158724 A1 | 8/2003 | Uchida |
| 2003/0158766 A1 | 8/2003 | Mital et al. |
| 2003/0172018 A1 | 9/2003 | Chen et al. |
| 2003/0172368 A1 | 9/2003 | Alumbaugh et al. |
| 2003/0195780 A1 | 10/2003 | Arora et al. |
| 2003/0208493 A1 | 11/2003 | Hall et al. |
| 2003/0217033 A1 | 11/2003 | Sandler et al. |
| 2003/0233301 A1 | 12/2003 | Chen et al. |
| 2003/0236721 A1 | 12/2003 | Plumer et al. |
| 2004/0030628 A1 | 2/2004 | Takamoto et al. |
| 2004/0039685 A1 | 2/2004 | Hambrecht et al. |
| 2004/0059611 A1 | 3/2004 | Kananghinis et al. |
| 2004/0059679 A1 | 3/2004 | Mizumachi et al. |
| 2004/0073477 A1 | 4/2004 | Heyns et al. |
| 2004/0093344 A1 | 5/2004 | Berger et al. |
| 2004/0111509 A1 | 6/2004 | Eilam et al. |
| 2004/0133876 A1 | 7/2004 | Sproule |
| 2004/0138942 A1 | 7/2004 | Pearson et al. |
| 2004/0186762 A1 | 9/2004 | Beaven et al. |
| 2004/0243438 A1 | 12/2004 | Mintz |
| 2004/0249737 A1 | 12/2004 | Tofte |
| 2005/0004856 A1 | 1/2005 | Brose et al. |
| 2005/0033631 A1 | 2/2005 | Wefers et al. |
| 2005/0038788 A1 | 2/2005 | Dettinger et al. |
| 2005/0044224 A1 | 2/2005 | Jun et al. |
| 2005/0060298 A1 | 3/2005 | Agapi et al. |
| 2005/0060317 A1 | 3/2005 | Lott et al. |
| 2005/0071285 A1 | 3/2005 | Laicher et al. |
| 2005/0091102 A1 | 4/2005 | Retsina |
| 2005/0120032 A1 | 6/2005 | Liebich et al. |
| 2005/0144110 A1 | 6/2005 | Chen et al. |
| 2005/0171918 A1 | 8/2005 | Eden et al. |
| 2005/0235020 A1 | 10/2005 | Gabelmann et al. |
| 2005/0246482 A1 | 11/2005 | Gabelmann et al. |
| 2006/0010156 A1 | 1/2006 | Netz et al. |
| 2006/0010294 A1 | 1/2006 | Pasumansky et al. |
| 2006/0041458 A1 | 2/2006 | Ringrose et al. |
| 2006/0041501 A1 | 2/2006 | Tabata et al. |
| 2006/0059032 A1 | 3/2006 | Wong et al. |
| 2006/0074980 A1 | 4/2006 | Sarkar |
| 2006/0080264 A1 | 4/2006 | Zhang et al. |
| 2006/0085302 A1 | 4/2006 | Weiss et al. |

(56) References Cited

U.S. PATENT DOCUMENTS

| | | |
|---|---|---|
| 2006/0085465 A1 | 4/2006 | Nori et al. |
| 2006/0106658 A1 | 5/2006 | Johanson et al. |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1 | 9/2006 | Jackson |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzbert et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0129892 A1 | 6/2007 | Smartt et al. |
| 2007/0179975 A1 | 8/2007 | Teh et al. |
| 2007/0185785 A1 | 8/2007 | Carlson et al. |
| 2007/0198317 A1 | 8/2007 | Harthcryde et al. |
| 2007/0198982 A1 | 8/2007 | Bolan et al. |
| 2007/0214413 A1 | 9/2007 | Boeckenhauer |
| 2007/0226090 A1 | 9/2007 | Stratton |
| 2007/0260532 A1 | 11/2007 | Blake, III |
| 2007/0271203 A1 | 11/2007 | Delvat |
| 2007/0276755 A1 | 11/2007 | Rapp |
| 2007/0282626 A1 | 12/2007 | Zhang et al. |
| 2008/0027957 A1* | 1/2008 | Bruckner .............. G06F 16/244 |
| 2008/0033774 A1 | 2/2008 | Kimbrel et al. |
| 2008/0059945 A1 | 3/2008 | Sauer et al. |
| 2008/0060058 A1 | 3/2008 | Shea et al. |
| 2008/0065435 A1 | 3/2008 | Ratzloff |
| 2008/0071844 A1 | 3/2008 | Gopal et al. |
| 2008/0082186 A1 | 4/2008 | Hood et al. |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1 | 8/2008 | Choi et al. |
| 2008/0208647 A1 | 8/2008 | Hawley et al. |
| 2008/0208667 A1 | 8/2008 | Lymbery et al. |
| 2008/0222638 A1 | 9/2008 | Beaty et al. |
| 2008/0239393 A1 | 10/2008 | Navon |
| 2008/0255912 A1 | 10/2008 | Christiansen et al. |
| 2008/0295096 A1 | 11/2008 | Beaty et al. |
| 2008/0312979 A1 | 12/2008 | Lee et al. |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1 | 1/2009 | Bailey et al. |
| 2009/0063251 A1 | 3/2009 | Rangarajan et al. |
| 2009/0063540 A1 | 3/2009 | Mattox et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 6/2009 | Tsern et al. |
| 2009/0198535 A1 | 8/2009 | Brown et al. |
| 2009/0199192 A1 | 8/2009 | Laithwaite et al. |
| 2009/0216580 A1 | 8/2009 | Bailey et al. |
| 2009/0222742 A1 | 9/2009 | Pelton et al. |
| 2009/0234892 A1 | 9/2009 | Anglin et al. |
| 2009/0300173 A1 | 12/2009 | Bakman et al. |
| 2009/0319316 A1 | 12/2009 | Westerfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1 | 2/2010 | Liu et al. |
| 2010/0049494 A1 | 2/2010 | Radibratovic et al. |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0153282 A1 | 6/2010 | Graham |
| 2010/0161371 A1 | 6/2010 | Cantor et al. |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariff et al. |
| 2010/0250421 A1 | 9/2010 | Ariff et al. |
| 2010/0250642 A1 | 9/2010 | Yellin et al. |
| 2010/0293163 A1 | 11/2010 | McLachlan et al. |
| 2010/0299233 A1 | 11/2010 | Licardi et al. |
| 2010/0306382 A1 | 12/2010 | Cardosa et al. |
| 2010/0323754 A1 | 12/2010 | Nakagawa |
| 2010/0325506 A1 | 12/2010 | Cai et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066472 A1 | 3/2011 | Scheider |
| 2011/0066628 A1 | 3/2011 | Jayaraman |
| 2011/0072340 A1 | 3/2011 | Miller |
| 2011/0106691 A1 | 5/2011 | Clark et al. |
| 2011/0107254 A1* | 5/2011 | Moroze .................. G06F 17/245<br>715/782 |
| 2011/0167034 A1 | 7/2011 | Knight et al. |
| 2011/0196795 A1 | 8/2011 | Pointer |
| 2011/0225277 A1 | 9/2011 | Freimuth et al. |
| 2011/0238608 A1 | 9/2011 | Sathish |
| 2011/0261049 A1 | 10/2011 | Cardno et al. |
| 2011/0295766 A1 | 12/2011 | Tompkins |
| 2011/0313947 A1 | 12/2011 | Grohavaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |
| 2012/0150736 A1 | 6/2012 | Dickerson et al. |
| 2012/0185368 A1 | 7/2012 | Schloter et al. |
| 2012/0232947 A1* | 9/2012 | McLachlan ............ G06Q 10/06<br>705/7.23 |
| 2012/0233217 A1 | 9/2012 | Purpus et al. |
| 2012/0233547 A1 | 9/2012 | McLachlan |
| 2012/0239739 A1 | 9/2012 | Manglik et al. |
| 2012/0246046 A1 | 9/2012 | Hirsch |
| 2012/0272234 A1 | 10/2012 | Kaiser et al. |
| 2012/0330869 A1 | 12/2012 | Durham |
| 2013/0028537 A1 | 1/2013 | Miyake et al. |
| 2013/0041792 A1 | 2/2013 | King et al. |
| 2013/0041819 A1 | 2/2013 | Khasho |
| 2013/0060595 A1 | 3/2013 | Bailey |
| 2013/0066866 A1 | 3/2013 | Chan et al. |
| 2013/0091456 A1 | 4/2013 | Sherman et al. |
| 2013/0091465 A1 | 4/2013 | Kikin-Gil et al. |
| 2013/0103654 A1 | 4/2013 | McLachlan et al. |
| 2013/0124454 A1 | 5/2013 | Bhide et al. |
| 2013/0124459 A1 | 5/2013 | Iwase et al. |
| 2013/0138470 A1 | 5/2013 | Goyal et al. |
| 2013/0173159 A1 | 7/2013 | Trum et al. |
| 2013/0179371 A1 | 7/2013 | Jain et al. |
| 2013/0201193 A1 | 8/2013 | McLachlan et al. |
| 2013/0227584 A1 | 8/2013 | Greene et al. |
| 2013/0268307 A1 | 10/2013 | Li et al. |
| 2013/0282537 A1 | 10/2013 | Snider |
| 2013/0293551 A1 | 11/2013 | Erez et al. |
| 2013/0339274 A1 | 12/2013 | Willis et al. |
| 2013/0346390 A1 | 12/2013 | Jerzak et al. |
| 2014/0006085 A1 | 1/2014 | McLachlan et al. |
| 2014/0006222 A1 | 1/2014 | Hericks et al. |
| 2014/0067632 A1 | 3/2014 | Curtis |
| 2014/0075004 A1 | 3/2014 | Van Dusen et al. |

(56) References Cited

U.S. PATENT DOCUMENTS

| | | |
|---|---|---|
| 2014/0089509 A1 | 3/2014 | Akolkar et al. |
| 2014/0108295 A1* | 4/2014 | Renshaw ............... G06Q 40/06 705/36 R |
| 2014/0122374 A1 | 5/2014 | Hacigumus et al. |
| 2014/0129583 A1 | 5/2014 | Munkes et al. |
| 2014/0136295 A1 | 5/2014 | Wasser |
| 2014/0143175 A1 | 5/2014 | Greenshields et al. |
| 2014/0172918 A1 | 6/2014 | Kornmann et al. |
| 2014/0229212 A1 | 8/2014 | MacElheron et al. |
| 2014/0244364 A1 | 8/2014 | Evers |
| 2014/0252095 A1 | 9/2014 | Kikin |
| 2014/0257928 A1 | 9/2014 | Chen et al. |
| 2014/0278459 A1 | 9/2014 | Morris |
| 2014/0279121 A1 | 9/2014 | George et al. |
| 2014/0279201 A1 | 9/2014 | Iyoob et al. |
| 2014/0279676 A1 | 9/2014 | Schafer et al. |
| 2014/0288987 A1 | 9/2014 | Liu |
| 2014/0337007 A1 | 11/2014 | Waibel et al. |
| 2014/0351166 A1 | 11/2014 | Schlossberg |
| 2014/0365503 A1 | 12/2014 | Franceschini et al. |
| 2014/0365504 A1 | 12/2014 | Franceschini et al. |
| 2015/0006552 A1 | 1/2015 | Lord |
| 2015/0012328 A1 | 1/2015 | McLachlan et al. |
| 2015/0046363 A1 | 2/2015 | McNamara et al. |
| 2015/0066808 A1 | 3/2015 | Legare et al. |
| 2015/0074075 A1 | 3/2015 | Alexander |
| 2015/0088584 A1 | 3/2015 | Santiago, III et al. |
| 2015/0120370 A1 | 4/2015 | Agrawal et al. |
| 2015/0278024 A1 | 10/2015 | Barman et al. |
| 2015/0294273 A1 | 10/2015 | Barraci et al. |
| 2015/0302303 A1 | 10/2015 | Hakim |
| 2015/0341230 A1 | 11/2015 | Dave et al. |
| 2016/0098234 A1 | 4/2016 | Weaver et al. |
| 2017/0091689 A1* | 3/2017 | Elliott ............. G06Q 10/06315 |
| 2017/0102246 A1 | 4/2017 | Yang |
| 2018/0068246 A1 | 3/2018 | Crivat et al. |

OTHER PUBLICATIONS

"Activity Based Costing is the best allocation methodology," APPTIO, Community for Technology Business Management, Mar. 16, 2010, 2 pages.
"Amazon Elastic Computer Cloud (Amazon EC2)", archive.org, Oct. 21, 2011, 9 pages http://web.archive.org/web/20111029130914/http://aws.amazon.com/ec2/#pricing.
"Apptio Extends Leadership in Cloud Business Management with Launch of Apptio Cloud Express," Apptio, Dec. 12, 2012, 2 pages httpl://www.apptio.com/news/apptio-extends-leadership-cloud-business-management-launch-apptio-cloud-express#.Ukm4r8X7Lco.
"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.
"Automating Cost Transparency," Apptio, 2008, 15 pages htto://www.cio.com/documents/whitepapers/AutomatedCostTransparency.pdf.
"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.
"IT Cost Transparency and Apptio," Dec. 4, 2008, 2 pages http://web.archive.org/web/20081204012158/http://www.apptio.com/solutions.
"Notice from the European Patent Office dated Oct. 1, 2007 concerning business methods," Official journal EPO, Nov. 2007, pp. 592-593.
"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.
"Project Management," Wikipedia, the free encyclopedia, accessed Mar. 13, 2012, 14 pages http://en.wikipedia.org/wiki/Project_management—last modified Mar. 7, 2012.
"Visualization for Production Management: Treemap and Fisheye Table Browser," Open-Video Organization webpages, 2001, 2 pages http://www.open-video.org/details.php?videoid=4547.
Busch, J., "Six Strategies for IT Cost Allocation," Spend Matters, Jan. 5, 2011, 3 pages http://spendmatters.com/2011/01/05/six-strategies-for-it-cost-allocation/.
Morgan, T. P., "Apptio puffs up freebie cost control freak for public clouds," The Register, Dec. 12, 2012, 2 pages http://www.theregister.co.uk/2012/12/12/apptio_cloud_express.
Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.
Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.
Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.
International Search Report and Written Opinion for International Patent Application No. PCT/US2010/035021 dated Jul. 14, 2010, 12 pages.
International Preliminary Report on Patentability for International Patent Application No. PCT/US2010/035021 dated Nov. 24, 2011, 10 pages.
International Search Report and Written Opinion for International Patent Application No. PCT/US2012/028353 dated Oct. 31, 2012, 9 pages.
International Preliminary Report on Patentability for International Patent Application No. PCT/US2012/028353 dated Sep. 19, 2013, 6 pages.
International Search Report and Written Opinion for International Patent Application No. PCT/US2012/028378 dated Sep. 12, 2012, 11 pages.
International Preliminary Report on Patentability for International Patent Application No. PCT/US2012/028378 dated Sep. 19, 2013, 7 pages.
Extended European Search Report in EP Application No. 13151967.0-1955, dated Apr. 19, 2013, 3 pages.
Official Communication for U.S. Appl. No. 12/467,120 dated Oct. 4, 2011, 12 pages.
Official Communication for U.S. Appl. No. 12/467,120 dated Jun. 20, 2012, 17 pages.
Official Communication for U.S. Appl. No. 12/467,120 dated Aug. 29, 2012, 3 pages.
Official Communication for U.S. Appl. No. 12/467,120 dated Oct. 23, 2013, 21 pages.
Official Communication for U.S. Appl. No. 12/467,120 dated Mar. 26, 2013, 18 pages.
Official Communication for U.S. Appl. No. 13/324,253 dated Sep. 25, 2012, 17 pages.
Official Communication for U.S. Appl. No. 13/324,253 dated Jan. 10, 2013, 20 pages.
Official Communication for U.S. Appl. No. 13/324,253 dated Mar. 19, 2013, 3 pages.
Official Communication for U.S. Appl. No. 13/324,253 dated Sep. 6, 2013, 21 pages.
Official Communication for U.S. Appl. No. 13/415,797 dated Oct. 3, 2013, 17 pages.
Official Communication for U.S. Appl. No. 13/452,628 dated Apr. 22, 2013, 11 pages.
Official Communication for U.S. Appl. No. 13/675,837 dated Oct. 10, 2013, 41 pages.
Official Communication for U.S. Appl. No. 13/837,815 dated Oct. 23, 2013, 9 pages.
Official Communication for U.S. Appl. No. 13/917,478 dated Nov. 7, 2013, 15 pages.

(56) References Cited

OTHER PUBLICATIONS

Official Communication for U.S. Appl. No. 13/917,503 dated Oct. 10, 2013, 41 pages.
Official Communication for U.S. Appl. No. 13/935,147 dated Oct. 22, 2013, 16 pages.
Official Communication for U.S. Appl. No. 13/649,019 dated Sep. 23, 2015, 15 pages.
Official Communication for U.S. Appl. No. 13/365,150 dated Sep. 24, 2015, 15 pages.
Official Communication for U.S. Appl. No. 14/033,130 dated Sep. 15, 2015, 22 pages.
Official Communication for U.S. Appl. No. 13/452,628 dated Jan. 12, 2016, 21 pages.
Official Communication for U.S. Appl. No. 13/649,019 dated Jan. 4, 2016, 8 pages.
European Examination Report for Application No. 14159413.5 dated Jul. 15, 2015, 9 pages.
Office Communication for U.S. Appl. No. 13/415,701 dated Oct. 27, 2015, 16 pages.
Official Communication for U.S. Appl. No. 14/869,721 dated Jan. 13, 2016, 57 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Official Communication for U.S. Appl. No. 13/452,628 dated Nov. 18, 2013, 15 pages.
Official Communication for U.S. Appl. No. 14/033,130 dated Dec. 16, 2013, 15 pages.
Official Communication for U.S. Appl. No. 13/324,253 dated Jan. 23, 2014, 15 pages.
Official Communication for U.S. Appl. No. 13/675,837 dated Jan. 31, 2014, 37 pages.
Official Communication for U.S. Appl. No. 13/917,503 dated Jan. 31, 2014, 25 pages.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/20120114538649/http://aws.amazon.com/rds/reserved-instances/?
Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/415,797 dated Apr. 9, 2014, 18 pages.
Office Communication for U.S. Appl. No. 13/324,253 dated Apr. 9, 2014, 3 pages.
Office Communication for U.S. Appl. No. 13/324,253 dated Oct. 24, 2014, 26 pages.
Office Communication for U.S. Appl. No. 13/365,150 dated Dec. 3, 2014, 16 pages.

Office Communication for U.S. Appl. No. 13/452,628 dated Oct. 1, 2014, 14 pages.
Office Communication for U.S. Appl. No. 13/837,815 dated Apr. 7, 2014, 14 pages.
Office Communication for U.S. Appl. No. 13/365,150 dated Dec. 7, 2015, 3 pages.
Office Communication for U.S. Appl. No. 13/675,837 dated Apr. 2, 2014, 3 pages.
Office Communication for U.S. Appl. No. 13/917,503 dated Apr. 3, 2014, 3 pages.
Office Communication for U.S. Appl. No. 13/935,147 dated Apr. 11, 2014, 22 pages.
Office Communication for U.S. Appl. No. 13/935,147 dated Jun. 16, 2014, 3 pages.
Office Communication for U.S. Appl. No, 14/033,130 dated May 27, 2014, 22 pages.
Office Communication for U.S. Appl. No, 14/033,130 dated Aug. 5, 2014, 3 pages.
Office Communication for U.S. Appl. No. 14/180,308 dated Jan. 30, 2015, 21 pages.
Office Communication for U.S. Appl. No. 14/180,308 dated Apr. 8, 2014, 16 pages.
Office Communication for U.S. Appl. No. 13/452,628 dated Mar. 13, 2014, 15 pages.
SAS Activity-Based Management, 2010, Fact Sheet, 4 pages.
Office Communication for U.S. Appl. No. 14/180,308 dated Sep. 2, 2014, 19 pages.
Office Communication for U.S. Appl. No. 14/180,308 dated Apr. 17, 2015, 5 pages.
Extended European Search Report in EP Application No. 14159413.5 dated Jul. 4, 2014, 11 pages.
Office Communication for U.S. Appl. No. 13/415,797 dated Jan. 12, 2015, 20 pages.
Office Communication for U.S. Appl. No. 13/837,815 dated Sep. 25, 2014, 16 pages.
Office Communication for U.S. Appl. No. 13/324,253 dated Feb. 19, 2015, 22 pages.
Henriet et al. "Traffic-Based Cost Allocation in a Network." The Rand Journal of Economics, 1996, pp. 332-345.
Rudnick et al,, "Marginal Pricing and Supplement Cost Allocation in Transmission Open Access." Power Systems, IEEE Transactions on 10.2. 1995, pp. 1125-1132.
Office Communication for U.S. Appl. No. 13/949,019 dated Feb. 10, 2015, 14 pages.
European Search Report for Application No. 12755613.2 dated Jan. 26, 2015, 6 pages.
Office Communication for U.S. Appl. No. 13/452,628 dated Mar. 30, 2015, 18 pages.
Office Communication for U.S. Appl. No. 13/917,503 dated Apr. 16, 2015, 19 pages.
Office Communication for U.S. Appl. No. 13/675,837 dated Apr. 16, 2015, 19 pages.
Office Communication for U.S. Appl. No. 13/837,815 dated Apr. 27, 2015, 18 pages.
Office Communication for U.S. Appl. No. 13/452,628 dated Jun. 23, 2015, 3 pages.
Office Communication for U.S. Appl. No. 13/415,797 dated Jul. 23, 2015, 22 pages.
International Search Report and Written Opinion for PCT/US2015/015486 dated Jun. 29, 2015, 13 pages.
Office Communication for U.S. Appl. No. 13/935,147 dated Jul. 9, 2015, 6 pages.
Official Communication for U.S. Appl. No. 13/415,797 dated Oct. 19, 2015, 3 pages.
Official Communication for U.S. Appl. No. 13/837,815 dated Sep. 28, 2015, 20 pages.
Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).

(56) References Cited

OTHER PUBLICATIONS

David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2003, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 13/837,815, dated Apr. 13, 2016, 22 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 13/935,147 dated Mar. 9, 2016, 10 pages.
Official Communication for U.S. Appl. No. 14/033,130 dated Feb. 18, 2016, 22 pages.
Official Communication for U.S. Appl. No. 14/867,552 dated Oct. 3, 2016, 19 pages.
Office Communication for U.S. Appl. No. 14/837,815 dated Jun. 23, 2016, 3 pages.
Office Communication for U.S. Appl. No. 14/033,130 dated Apr. 25, 2016, 4 pages.
Office Communication for U.S. Appl. No. 14/846,349 dated Jul. 1, 2016, 24 pages.
Office Communication for U.S. Appl. No. 14/869,721 dated Jun. 1, 2016, 35 pages.
Office Communication for U.S. Appl. No. 14/971,944 dated May 19, 2016, 17 pages.
Office Communications for U.S. Appl. No. 14/977,368 dated Jun. 7, 2016, 11 pages.
Office Communication for U.S. Appl. No. 14/981,747 dated Jul. 14, 2016, 29 pages.
Official Communication for U.S. Appl. No. 14/130,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.
Official Communication for U.S. Appl. No. 13/837,815 dated Nov. 9, 2016, 11 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.
Official Communication for U.S. Appl. No. 13/415,797 dated Jan. 11, 2017.
Official Communication for U.S. Appl. No. 13/675,837 dated Jan. 11, 2017.
Official Communication for U.S. Appl. No. 13/917,503 dated Jan. 12, 2017.
Official Communication for U.S. Appl. No. 14/033,130 dated Jan. 11, 2017.
Official Communication for U.S. Appl. No. 14/867,552 dated Jan. 9, 2017.
Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 15/379,267 dated Mar. 10, 2017, 11 pages.
Official Communication for U.S. Appl. No. 14/180,308 dated Feb. 8, 2017.
Official Communication for U.S. Appl. No. 14/846,349 dated Mar. 1, 2017.
Official Communication for U.S. Appl. No. 13/935,147 dated Mar. 7, 2017.
Official Communication for U.S. Appl. No. 13/365,150 dated Mar. 15, 2017.
Official Communication for U.S. Appl. No. 13/452,628 dated Mar. 9, 2017.
Official Communication for U.S. Appl. No. 15/379,267 dated Mar. 10, 2017.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 14/981,747 dated May 19, 2017, 43 pages.
Official Communication for U.S. Appl. No. 15/271,013 dated May 24, 2017, 37 pages.
Official Communication for U.S. Appl. No. 14/180,308 dated May 25, 2017, 21 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.

(56) References Cited

OTHER PUBLICATIONS

Official Communication for U.S. Appl. No. 14/867,552 dated Nov. 29, 2017, 12 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 15/379,267 dated Jun. 30, 2017, 16 pages.
Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 13/365,150 dated Aug. 23, 2017, 30 pages.
Official Communication for U.S. Appl. No. 15/260,221 dated Aug. 15, 2017, 21 pages.
Official Communication for U.S. Appl. No. 14/846,349 dated Nov. 20, 2017, 3 pages.
Official Communication for U.S. Appl. No. 13/917,503 dated Nov. 28, 2017, 26 pages.
Official Communication for U.S. Appl. No. 13/935,147 dated Nov. 3, 2017, 11 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
US 5,649,211, 04/1997, Horkin et al. (withdrawn)
Official Communication for U.S. Appl. No. 13/917,503 dated Nov. 20, 2018, pp. 1-55.
Official Communication for U.S. Appl. No. 14/869,721 dated Oct. 11, 2018, pp. 1-73.
Official Communication for U.S. Appl. No. 14/867,552 dated Nov. 21, 2018, pp. 1-37.
Official Communication for U.S. Appl. No. 15/260,221 dated Oct. 5, 2018, pp. 1-40.
Official Communication for U.S. Appl. No. 15/379,267 dated Oct. 18, 2018, pp. 1-9.
Official Communication for U.S. Appl. No. 15/859,058 dated Dec. 5, 2018, pp. 1-20.
Official Communication for U.S. Appl. No. 14/033,130 dated Dec. 18, 2018, pp. 1-11.
Official Communication for U.S. Appl. No. 15/271,013 dated Dec. 18, 2018, pp. 1-47.
Official Communication for U.S. Appl. No. 13/917,503 dated Jul. 19, 2018, pp. 1-3.
Official Communication for U.S. Appl. No. 14/846,349 dated Jul. 20, 2018, pp. 1-40.
Official Communication for U.S. Appl. No. 14/981,747 dated Jul. 5, 2018, pp. 1-62.
Official Communication for U.S. Appl. No. 15/271,013 dated Jul. 6, 2018, pp. 1-49.
Official Communication for U.S. Appl. No. 15/379,267 dated Jul. 19, 2018, pp. 1-34.
Official Communication for U.S. Appl. No. 13/935,147 dated Aug. 10, 2018.
Official Communication for U.S. Appl. No. 14/033,130 dated Aug. 9, 2018.
Official Communication for U.S. Appl. No. 15/858,945 dated Sep. 10, 2018.
Official Communication for U.S. Appl. No. 15/859,008 dated Jul. 31, 2018.
Official Communication for U.S. Appl. No. 14/180,308 dated Aug. 6, 2018.
Official Communication for U.S. Appl. No. 13/935,147 dated Mar. 28, 2019, pp. 1-80.
Official Communication for U.S. Appl. No. 14/033,130 dated Apr. 10, 2019, pp. 1-80.
Official Communication for U.S. Appl. No. 14/180,308 dated Feb. 26, 2019, pp. 1-26.
Official Communication for U.S. Appl. No. 14/846,349 dated Apr. 11, 2019, pp. 1-57.
Official Communication for U.S. Appl. No. 14/867,552 dated Feb. 11, 2019, pp. 1-76.
Official Communication for U.S. Appl. No. 14/981,747 dated Dec. 26, 2018, pp. 1-63.
Official Communication for U.S. Appl. No. 15/260,221 dated Jan. 8, 2019, pp. 1-27.
Official Communication for U.S. Appl. No. 13/917,503 dated Apr. 1, 2019, pp. 1-38.
Official Communication for U.S. Appl. No. 15/858,945 dated Feb. 26, 2019, pp. 1-13.
Official Communication for U.S. Appl. No. 15/859,058 dated Mar. 25, 2019, pp. 1-57.
Official Communication for U.S. Appl. No. 15/859,008 dated Apr. 12, 2019, pp. 1-24.
Official Communication for U.S. Appl. No. 14/869,721 dated Jun. 20, 2019, pp. 1-346.
Official Communication for U.S. Appl. No. 14/180,308 dated Jun. 11, 2019, pp. 1-26.
Official Communication for U.S. Appl. No. 15/260,221 dated Jul. 11, 2019, pp. 1-40.
Official Communication for U.S. Appl. No. 14/981,747 dated May 8, 2019, pp. 1-77.
Official Communication for U.S. Appl. No. 15/271,013 dated Jun. 14, 2019, pp. 1-8.
International Search Report and Written Opinion for International Patent Application No. PCT/US2010/035021 dated Jul. 14, 2010.
International Preliminary Report on Patentability for International Patent Application No. PCT/US2010/035021 dated Nov. 24, 2011.
International Search Report and Written Opinion for International Patent Application No. PCT/US2012/028353 dated Oct. 31, 2012.
International Preliminary Report on Patentability for International Patent Application No. PCT/US2012/028353 dated Sep. 19, 2013.
International Search Report and Written Opinion for International Patent Application No. PCT/US2012/028378 dated Sep. 12, 2012.
International Preliminary Report on Patentability for International Patent Application No. PCT/US2012/028378 dated Sep. 19, 2013.
Extended European Search Report in EP Application No. 13151967.0-1955, dated Apr. 19, 2013.
Official Communication for U.S. Appl. No. 12/467,120 dated Oct. 4, 2011.
Official Communication for U.S. Appl. No. 12/467,120 dated Jun. 20, 2012.
Official Communication for U.S. Appl. No. 12/467,120 dated Aug. 29, 2012.
Official Communication for U.S. Appl. No. 12/467,120 dated Oct. 23, 2013.
Official Communication for U.S. Appl. No. 12/467,120 dated Mar. 26, 2013.
Official Communication for U.S. Appl. No. 13/324,253 dated Sep. 25, 2012.
Official Communication for U.S. Appl. No. 13/324,253 dated Jan. 10, 2013.
Official Communication for U.S. Appl. No. 13/324,253 dated Mar. 19, 2013.
Official Communication for U.S. Appl. No. 13/324,253 dated Sep. 6, 2013.
Official Communication for U.S. Appl. No. 13/415,797 dated Oct. 3, 2013.
Official Communication for U.S. Appl. No. 13/452,628 dated Apr. 22, 2013.
Official Communication for U.S. Appl. No. 13/675,837 dated Oct. 10, 2013.
Official Communication for U.S. Appl. No. 13/837,815 dated Oct. 23, 2013.
Official Communication for U.S. Appl. No. 13/917,478 dated Nov. 7, 2013.
Official Communication for U.S. Appl. No. 13/917,503 dated Oct. 10, 2013.

(56) References Cited

OTHER PUBLICATIONS

Official Communication for U.S. Appl. No. 13/935,147 dated Oct. 22, 2013.
Office Communication for U.S. Appl. No. 13/649,019 dated Sep. 23, 2015.
Office Communication for U.S. Appl. No. 13/365,150 dated Sep. 24, 2015.
Office Communication for U.S. Appl. No. 14/033,130 dated Sep. 15, 2015.
Official Communication for U.S. Appl. No. 13/452,628 dated Jan. 12, 2016.
Official Communication for U.S. Appl. No. 13/649,019 dated Jan. 4, 2016.
European Examination Report for Application No. 14159413.5 dated Jul. 15, 2015.
Office Communication for U.S. Appl. No. 13/415,701 dated Oct. 27, 2015.
Official Communication for U.S. Appl. No. 14/869,721 dated Jan. 13, 2016.
Office Communication for U.S. Appl. No. 13/675,837 dated Oct. 26, 2015.
Office Communication for U.S. Appl. No. 13/917,503 dated Oct. 22, 2015.
Official Communication for U.S. Appl. No. 13/452,628 dated Nov. 18, 2013.
Official Communication for U.S. Appl. No. 14/033,130 dated Dec. 16, 2013.
Official Communication for U.S. Appl. No. 13/324,253 dated Jan. 23, 2014.
Official Communication for U.S. Appl. No. 13/675,837 dated Jan. 31, 2014.
Official Communication for U.S. Appl. No. 13/917,503 dated Jan. 31, 2014.
Office Communication for U.S. Appl. No. 13/415,797 dated Apr. 9, 2014.
Office Communication for U.S. Appl. No. 13/324,253 dated Apr. 9, 2014.
Office Communication for U.S. Appl. No. 13/324,253 dated Oct. 24, 2014.
Office Communication for U.S. Appl. No. 13/365,150 dated Dec. 3, 2014.
Office Communication for U.S. Appl. No. 13/452,628 dated Oct. 1, 2014.
Office Communication for U.S. Appl. No. 13/837,815 dated Apr. 7, 2014.
Office Communication for U.S. Appl. No. 13/365,150 dated Dec. 7, 2015.
Office Communication for U.S. Appl. No. 13/675,837 dated Apr. 2, 2014.
Office Communication for U.S. Appl. No. 13/917,503 dated Apr. 3, 2014.
Office Communication for U.S. Appl. No. 13/935,147 dated Apr. 11, 2014.
Office Communication for U.S. Appl. No. 13/935,147 dated Jun. 16, 2014.
Office Communication for U.S. Appl. No. 14/033,130 dated May 27, 2014.
Office Communication for U.S. Appl. No. 14/033,130 dated Aug. 5, 2014.
Office Communication for U.S. Appl. No. 14/180,308 dated Jan. 30, 2015.
Office Communication for U.S. Appl. No. 14/180,308 dated Apr. 8, 2014.
Office Communication for U.S. Appl. No. 13/452,628 dated Mar. 13, 2014.
Office Communication for U.S. Appl. No. 14/180,308 dated Sep. 2, 2014.
Office Communication for U.S. Appl. No. 14/180,308 dated Apr. 17, 2015.
Extended European Search Report in EP Application No. 14159413.5 dated Jul. 4, 2014.
Office Communication for U.S. Appl. No. 13/415,797 dated Jan. 12, 2015.
Office Communication for U.S. Appl. No. 13/837,815 dated Sep. 25, 2014.
Office Communication for U.S. Appl. No. 13/324,253 dated Feb. 19, 2015.
Office Communication for U.S. Appl. No. 13/949,019 dated Feb. 10, 2015.
European Search Report for Application No. 12755613.2 dated Jan. 26, 2015.
Office Communication for U.S. Appl. No. 13/452,628 dated Mar. 30, 2015.
Office Communication for U.S. Appl. No. 13/917,503 dated Apr. 16, 2015.
Office Communication for U.S. Appl. No. 13/675,837 dated Apr. 16, 2015.
Office Communication for U.S. Appl. No. 13/837,815 dated Apr. 27, 2015.
Office Communication for U.S. Appl. No. 13/452,628 dated Jun. 23, 2015.
Office Communication for U.S. Appl. No. 13/415,797 dated Jul. 23, 2015.
International Search Report and Written Opinion for PCT/US2015/015486 dated Jun. 29, 2015.
Office Communication for U.S. Appl. No. 13/925,147 dated Jul. 9, 2015.
Official Communication for U.S. Appl. No. 13/415,797 dated Oct. 19, 2015.
Official Communication for U.S. Appl. No. 13/837,815 dated Sep. 28, 2015.
Office Communication for U.S. Appl. No. 14/846,349 dated Dec. 17, 2015.
International Search Report and Written Opinion for PCT/US2015/048697 dated Mar. 31, 2016.
Office Communication for U.S. Appl. No. 13/365,150, dated Apr. 6, 2016.
Office Communication for U.S. Appl. No. 14/722,663, dated Mar. 31, 2016.
Office Communication for U.S. Appl. No. 13/415,797, dated Apr. 4, 2016.
Office Communication for U.S. Appl. No. 13/837,815, dated Apr. 13, 2016.
Official Communication for U.S. Appl. No. 14/869,721 dated Aug. 3, 2016.
Official Communication for U.S. Appl. No. 13/452,628 dated Aug. 18, 2016.
Official Communication for U.S. Appl. No. 13/935,147 dated Mar. 9, 2016.
Official Communication for U.S. Appl. No. 14/033,130 dated Feb. 18, 2016.
Official Communication for U.S. Appl. No. 14/867,552 dated Oct. 3, 2016.
Office Communication for U.S. Appl. No. 13/837,815 dated Jun. 23, 2016.
Office Communication for U.S. Appl. No. 14/033,130 dated Apr. 25, 2016.
Office Communication for U.S. Appl. No. 14/846,349 dated Jul. 1, 2016.
Office Communication for U.S. Appl. No. 14/869,721 dated Jun. 1, 2016.
Office Communication for U.S. Appl. No. 14/971,944 dated May 19, 2016.
Office Communication for U.S. Appl. No. 14/977,368 dated Jun. 7, 2016.
Office Communication for U.S. Appl. No. 14/981,747 dated Jul. 14, 2016.
Official Communication for U.S. Appl. No. 14/180,308 dated Oct. 19, 2016.
Official Communication for U.S. Appl. No. 14/977,368 dated Oct. 19, 2016.

(56) References Cited

OTHER PUBLICATIONS

Official Communication for U.S. Appl. No. 13/365,150 dated Oct. 24, 2016.
Official Communication for U.S. Appl. No. 13/837,815 dated Nov. 9, 2016.
Official Communication for U.S. Appl. No. 15/379,267 dated Jun. 30, 2017.
Official Communication for U.S. Appl. No. 14/867,552 dated Jun. 29, 2017.
Official Communication for U.S. Appl. No. 14/033,130 dated Jun. 29, 2017.
Official Communication for U.S. Appl. No. 13/837,815 dated Jun. 12, 2017.
Official Communication for U.S. Appl. No. 14/867,552 dated Nov. 29, 2017.
Official Communication for U.S. Appl. No. 14/981,747 dated Dec. 12, 2017.
Official Communication for U.S. Appl. No. 14/033,130 dated Dec. 20, 2017.
Official Communication for U.S. Appl. No. 14/180,308 dated Dec. 22, 2017, pp. 1-26.
Official Communication for U.S. Appl. No. 15/260,221 dated Jan. 9, 2018, pp. 1-28.
Official Communication for U.S. Appl. No. 15/379,267 dated Jan. 2, 2018, pp. 1-25.
Official Communication for U.S. Appl. No. 14/846,349 dated Jan. 18, 2018, pp. 1-39.
Official Communication for U.S. Appl. No. 13/837,815 dated Jan. 26, 2018, pp. 1-18.
Official Communication for U.S. Appl. No. 13/935,147 dated Jan. 17, 2018, pp. 1-3.
Official Communication for U.S. Appl. No. 14/869,721 dated Jan. 19, 2018, pp. 1-3.
Official Communication for U.S. Appl. No. 14/867,552 dated Feb. 13, 2018, pp. 1-3.
Official Communication for U.S. Appl. No. 15/859,008 dated Mar. 5, 2018, pp. 1-75.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 14/869,721 dated May 11, 2018, pp. 1-33.
Official Communication for U.S. Appl. No. 14/867,552 dated May 31, 2018, pp. 1-22.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 13/935,147 dated Apr. 5, 2018, pp. 1-14.
Official Communication for U.S. Appl. No. 13/935,147 dated Aug. 10, 2018, pp. 1-25.
Official Communication for U.S. Appl. No. 14/033,130 dated Aug. 9, 2018, pp. 1-47.
Official Communication for U.S. Appl. No. 15/858,945 dated Sep. 10, 2018, pp. 1-25.
Official Communication for U.S. Appl. No. 15/859,008 dated Jul. 31, 2018, pp. 1-28.
Official Communication for U.S. Appl. No. 14/180,308 dated Aug. 6, 2018, pp. 1-23

\* cited by examiner

IDENTIFYING RESOURCE ALLOCATION DISCREPANCIES

TECHNICAL FIELD

The present invention relates generally to computer automated resource allocation modeling, and more particularly, but not exclusively to identifying allocation discrepancies.

BACKGROUND

Businesses that strive to remain viable and successful in today's competitive commercial environment are required to adopt accurate and responsive resource allocation and resource budgeting practices. Businesses may use models that apply modern budgeting, forecasting and resource accounting techniques. For some resource allocation techniques, the complexity of the underlying data models may increase as the number of tracked activities and elements increases. Therefore, for larger enterprises, sophisticated computer programs and computers are often required to assist in generating useful and relevant resource models for analyzing resource allocations. In some cases, the large number of items and entities required for enterprise scale resource modeling may make development of resource models difficult. In some cases the complexity of the models and the modelled items and entities may make it difficult to compare efficiencies across large enterprises and/or between different enterprises. Likewise, this same complexity may make it difficult to identify errors in these models or underlying allocation problems. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein.

DETAILED DESCRIPTION OF THE VARIOUS EMBODIMENTS

Figure 1:
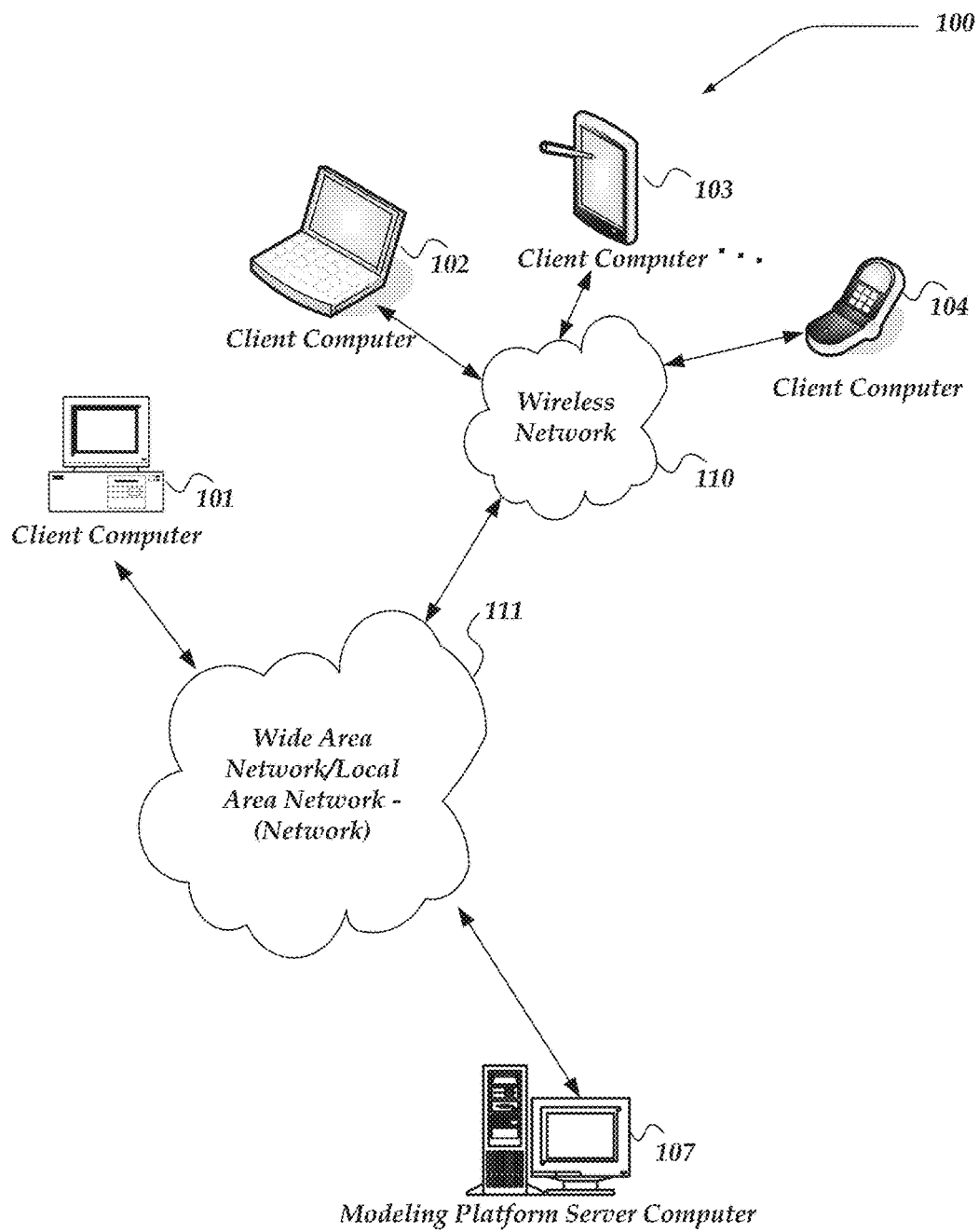
FIG. 1 illustrates a system diagram showing components of an environment in which at least one of the various embodiments may be practiced.

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "resource allocation model," and "data model" refer to a graph based representation of a system of resource allocation rules that may be used for tracking/analyzing resource allocation, resource consumption, resource budgeting, or the like. Nodes in the model may represent groups of items or objects that may be associated with resources and/or resource allocations. The edges of the graph may represent how resources may be allocated between the nodes (objects). A financial allocation model may be a visual rendering of a graph showing the nodes and the edges connecting the nodes.

As used herein, the term "model line item," refers to a single line item in a data model and its associated characteristics, including resources, costs, description, or the like. For example, the costs associated with a particular computer that is an email server may be represented by a single model line item having a particular cost (e.g., the email server may correspond to a model line item).

As used herein, the term "data object," or "model object" refers to a set and/or class of model line items that may be grouped together. Also, dataset information may be mapped to one or more categories by a modeling engine. For example, a collection of computers performing services such as email, web serving, enterprise resource planning, may represent separate model line items and they may be grouped into the Servers category and/or Servers Object. Nodes in the data model graph may be considered to represent model objects.

As used herein, the term "allocation rules" refer to rules in the data model that determine how the resources from a model object are apportioned between/among other model objects in the data model. Also, such rules may be assigned to individual model line items. For example, if an email server line item has a value of $1000 an allocation rule may be defined such that 50% of the expense may be allocated to the Marketing department and 50% may be allocated to the Engineering department. Also, allocation rules may be applied at the model objects as well as the model line item level.

As used herein, the term "assignment ratios," refers to the results of applying one or more allocation rules and it is the distribution ratio of resources to model line items or model objects. For example, if $1000 may be allocated to Servers object, and the model line item Email Server is allocated $800 and the model line item FTP Server is allocated $200, the assignment ratios may be determined to 80% to model line item Email Server and 20% to model line item FTP Server. Assignment ratios may be explicitly defined by allocation rules. Or, in some case, they may be derived from allocation tables by converting the values into ratios of the total allocation to the model object.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. In some embodiments, datasets may be ingested to produce data model objects for data models. Non-tabular datasets can also take the form of marked up strings of characters, such as an XML file.

As used herein, the term "source object" refers to a model object in a data model that may be providing resource values that may be allocated to one or more other model objects (target objects).

As used herein, the term "target object" refers to a model object in a data model that may be allocated resources from one or more other model objects (source objects).

As used herein, the term "benchmarking information" refers to values that are computers and/or generated from various sources, such as, community models, third-party/external information, industry surveys, or the like. Benchmarking information may be ratios, ranges, averages, means, median, min/max values, time-series, regressions, functions, or the like, or combination thereof, related to values associated with one or more model elements. A benchmarking engine may be arranged to generate various types of benchmarking information depending on the benchmark types, model types, model compositions, configurations, user input, or the like, or combination thereof.

As used herein, the term "discrepancy model" refers to a data structure the may be arranged to identify discrepancies in data models. In some cases, discrepancy models may be associated with one or more rules that may be applied to identify discrepancies in customer data or models. Rules may be comprised of heuristics, threshold values, confidence scores, or the like. Machine learning may be employed to modify the rules as feedback from users is provided.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated embodiments are directed to identifying allocation discrepancies. In at least one of the various embodiments, a plurality of data models and a plurality of benchmark models may be provided to an analysis engine, such that the plurality of data models may be comprised of two or more nodes and one or more edges from a memory that may be configured and arranged to store the plurality of data models, and each node may represent a model object and each edge may represent a resource allocation.

In at least one of the various embodiments, one or more discrepancy models may be provided to the analysis engine, such that each discrepancy model may be arranged to include one or more rules. In at least one of the various embodiments, the one or more rules may be arranged to include one or more threshold conditions that may correspond to one or more discrepancies in the plurality of data models.

In at least one of the various embodiments, the analysis engine may be employed to search for discrepancies in the plurality of data models based on the one or more discrepancy models and the plurality of benchmark models.

In at least one of the various embodiments, if one or more discrepancies may be identified by the analysis engine, additional actions may be performed. In at least one of the various embodiments, identifying the one or more discrepancies may include, comparing one or more resource allocation values associated with one or more model objects in a data model with a mean resource allocation value that may be associated with one or more corresponding benchmark objects.

In at least one of the various embodiments, one or more notifications may be provided to one or more users. In at least one of the various embodiments, the one or more discrepancy models may be modified based on subsequent feedback provided by the one or more users.

In at least one of the various embodiments, the analysis engine may be employed to traverse one or more data models of the plurality of data models. In at least one of the various embodiments, one or more model objects may be provided based on the traversal of the one or more data models. And, the one or more discrepancies may be identified based on an execution of one or more rules, such that the execution may compare one or more threshold values in the one or more rules to resource allocation values associated with the one or more model objects.

In at least one of the various embodiments, one or more data models associated with one or more customers may be traversed. Also, in at least one of the various embodiments, one or more other data models associated with one or more other customers may be traversed. In at least one of the various embodiments, the one or more rules may be executed to compare one or more model objects from the one or more data models and one or more other model objects from the one or more other data models. And, in at least one of the various embodiments, one or more discrepancies may be identified based on one or more affirmative results of the comparison.

In at least one of the various embodiments, one or more data models associated with one or more industry segments may be traversed to provide one or more model objects. In at least one of the various embodiments, the one or more rules may be executed to compare the one or more model objects, such that the one or more compared model objects may be associated with separate industry segments. And, in at least one of the various embodiments, one or more discrepancies may be identified based on one or more affirmative results of the comparison.

In at least one of the various embodiments, the plurality of data models may be traversed to identify clusters of resource allocation values associated with the one or more model objects. In at least one of the various embodiments, one or more correlations in the resource allocation values may be identified based on machine learning that includes one or more of linear regression, deep learning neural networks, or the like. And, in at least one of the various embodiments, one or more additional discrepancy models may be provided based on the one or more identified correlations.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")-(network) 111, wireless network 110, client computer 101-104, and Modeling Platform Server 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including resource allocation information, report requests (e.g., queries) between another computing device. Client applications may include a capability to provide requests and/or receive data relating to the data models, reports, project information, allocation rules, or the like. The client application may provide data representing assignment and/or allocation changes, selecting templates, editing cost allocations between or among categories, generating and/or modifying recursive allocation rules, or the like. In at least one of the various embodiments, client applications may receive and/or generate data related to data models and may generate tables and relationships between and among the data. In at least one of the various embodiments, client computers 101-104 may view and/or modify generated data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, modeling platform server computer 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
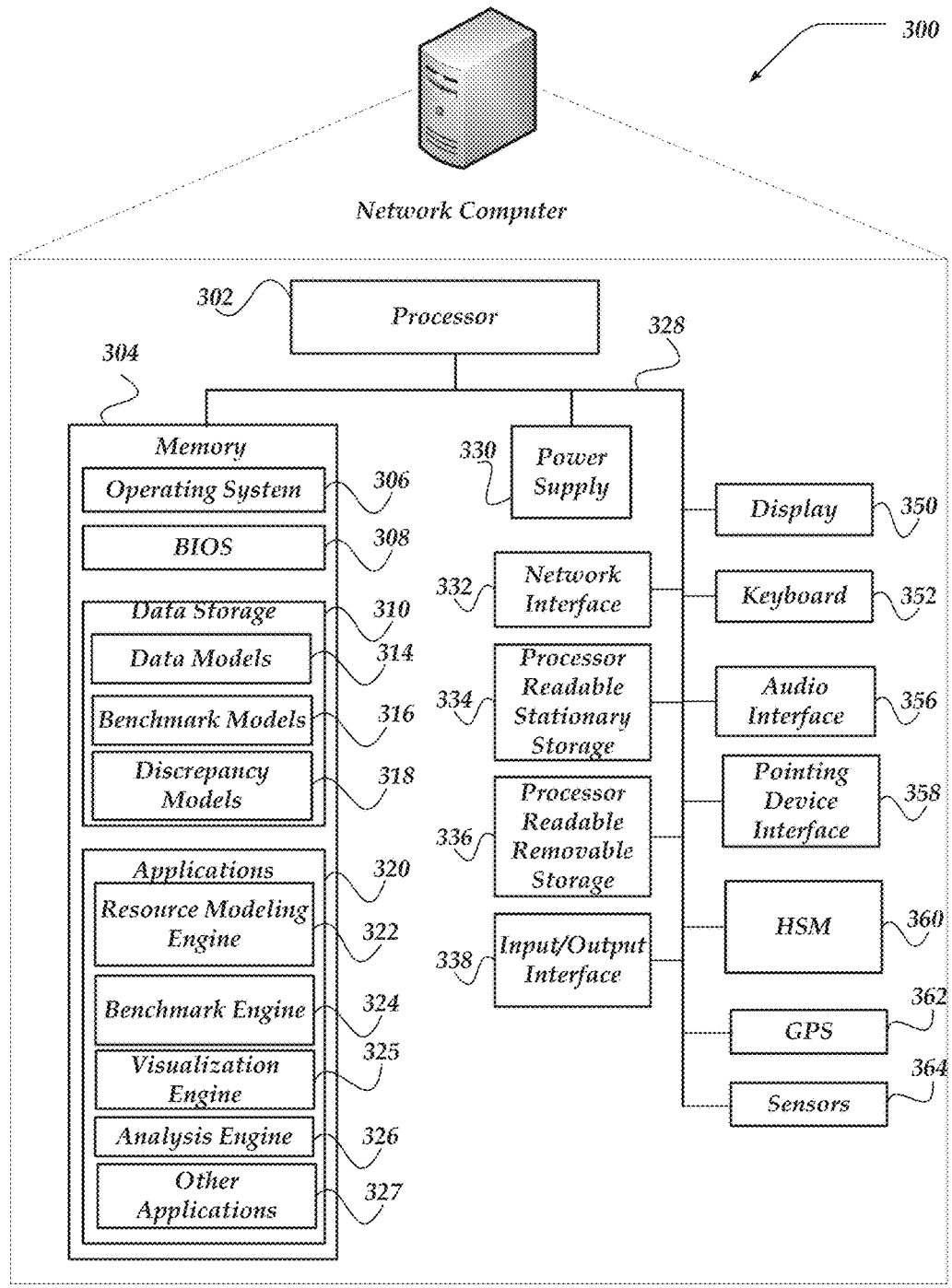
FIG. 3 illustrates one embodiment of a network computer that may be included in a system.

Modeling platform server computer 107 may include virtually any network computer usable to perform data processing operation that may be used for generating data models, allocation rules, recursive allocation rules, resource allocations, displays and/or reports thereof, such as network computer 300 of FIG. 3. In at least one of the various embodiments, modeling platform server computer 107 employs various techniques to create, define, generate, automated data processing applications for resource planning. Modeling platform server computer 107 may include modules for generating data processing applications that may provide and apply data models that may include dataset templates, category templates, allocation rules, recursive allocation rules or the like. Furthermore, modeling platform server computer 107 may include and/or generate data processing applications for visualizing the generated resource allocations, data models, reciprocal models, allocation rules, recursive allocation rules, or the like.

Devices that may operate as modeling platform server computer 107 include various network computers, including, but not limited to personal computers, desktop computers, multiprocessor systems, microprocessor-based or programmable consumer electronics, network PCs, server devices, tablet computers, network appliances, or the like. It should be noted that while modeling platform server computer 107 is illustrated as a single network computer, the invention is not so limited. Thus, in another embodiment, modeling platform server computer 107 may represent a plurality of network computers. For example, in at least one of the various embodiments, modeling platform server computer 107 may be distributed over a plurality of network computers and/or implemented using cloud architecture.

Moreover, modeling platform server computer 107 is not limited to a particular configuration. Rather, modeling platform server computer 107 may operate using a controller/worker approach over a plurality of network computers, within a cluster, a peer-to-peer architecture, cloud-based architecture (e.g., virtual machines), and/or any of a variety of other architectures. Thus, modeling platform server computer 107 is not to be construed as being limited to a single environment, and other configurations, and architectures are also envisaged. modeling platform server computer 107 may employ processes and architectures described below to perform at least some of its actions.

Illustrative Client Computer

Figure 2:
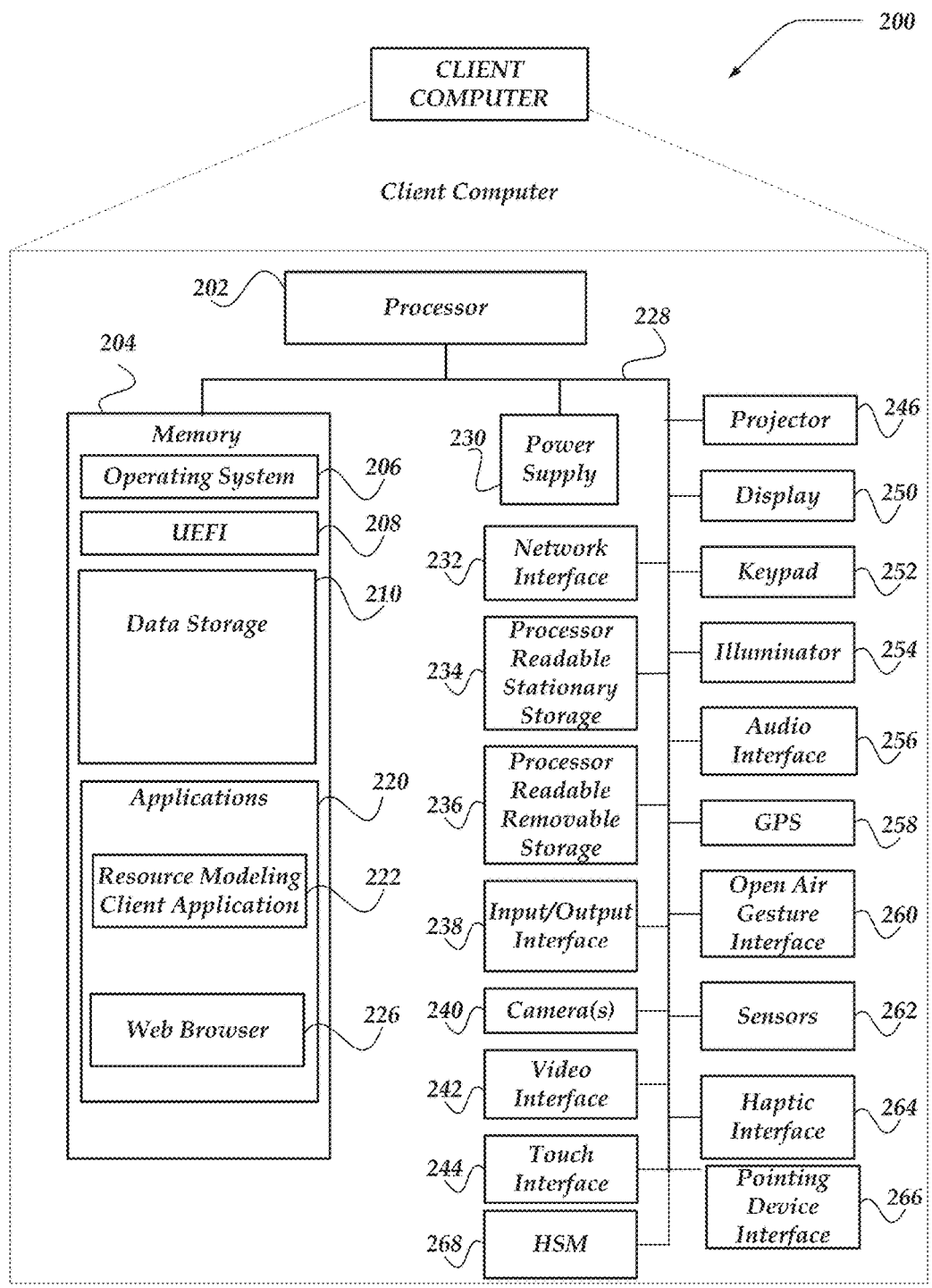
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, resource modeling client application 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, resource modeling client application 222. In at least one of the various embodiments, resource modeling client application 222 may be used to exchange communications to and from modeling platform server computer 107, including, but not limited to, queries, searches, API calls, configuration information, reports, notifications, benchmark information, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data model information 314, benchmark model information 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include resource modeling engine 322, benchmark modeling engine 324, visualization engine 325, analysis engine 326, other applications 327, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, resource modeling engine 322, benchmark modeling engine 324, visualization engine 325, analysis engine 326, other applications 327, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geo-location protocols over the networks, such as, wireless network 108 and/or network 111.

Furthermore, in at least one of the various embodiments, resource modeling engine 322, benchmark modeling engine 324, visualization engine 325, or analysis engine 326 may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to resource modeling engine 322, benchmark modeling engine 324, visualization engine 325, or analysis engine 326 may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

In at least one of the various embodiments, resource modeling engine 322, benchmark modeling engine 324, visualization engine 325, or analysis engine 326 may enable a user to generate project plans, allocation rules, data models, reports, what-if-analysis, or the like. Also in at least one of the various embodiments, resource modeling engine 322, benchmark modeling engine 324, visualization engine 325, or analysis engine 326 may employ processes, or parts of processes, similar to those described below.

Illustrative Logical System Architecture

Figure 4:
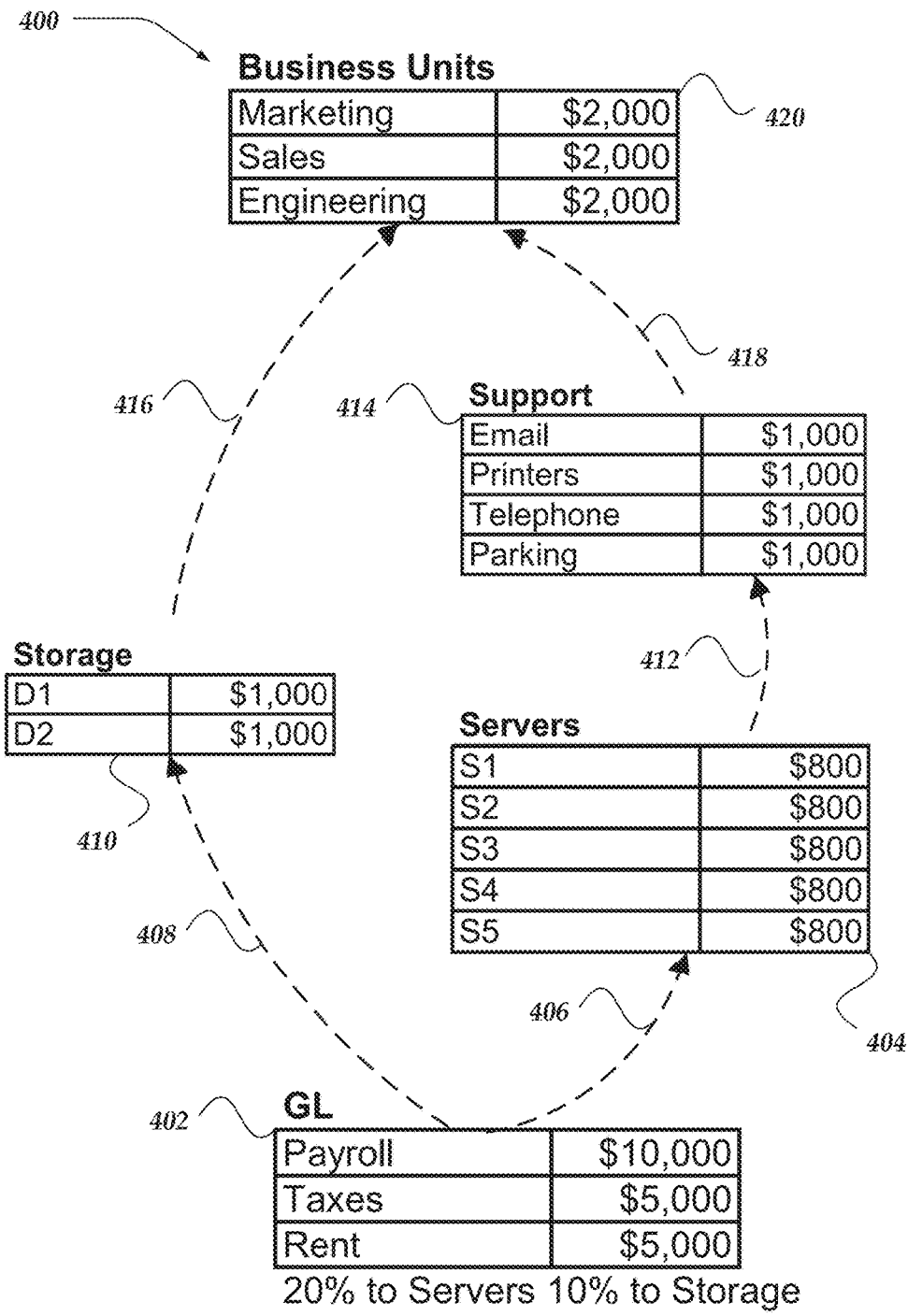
FIG. 4 illustrates a portion of a logical architecture for a data model that may be enabled by at least one of the various embodiments.

FIG. 4 illustrates a portion of a logical architecture for data model 400 that may be enabled by at least one of the various embodiments.

In at least one of the various embodiments, model 400 may have five objects: GL 402, Servers 404, Storage 410, Support 414, and Business Units 420. In at least one of the various embodiments, each object contains a set of resource cost line items. For example, GL 402 includes resource cost line items for Payroll, Taxes and Rent. Likewise, Support 414 includes resource cost line items Email, Printers, Telephone, and Parking. In at least one of the various embodiments, each resource cost line item has one or more associated resource values. For example, Storage 410 has two resource cost line items, D1, and D2 (e.g., disk drives) having associated resource cost values of $1000 each.

Allocation rules may be used to connect objects of data model 400. In at least one of the various embodiments, allocation rules may show how resources flow between the objects modeled by data model 400. Resulting in a graph where the objects may be represented as nodes and the allocation rules may be represented as edges. In at least one of the various embodiments, generally a data model may be represented by a directed acyclic graph but that is not a requirement for an operative model. In at least one of the various embodiments, a model graph may contain cycles that are resolved or estimated using mathematical techniques, including but not limited to Gaussian elimination, Cholesky decomposition or Newton's method.

In at least one of the various embodiments, data models may be arranged to be stored in self-referential database such that some or all of the data objects for a data model may be stored in the same table. Accordingly, different records in the table may be arranged to include references to other records in the same table that also represent data model objects for a data model. Accordingly, in some embodiments, the graph structure of a data model may be represented in a single table rather than require normalized databased tables. Accordingly, in some embodiments, the data models may be traversed by scanning through a single table rather than having to execute slower performing database query joins, or the like.

In at least one of the various embodiments, allocation rule 406 represents a rule allocating 20% of the resources of object GL 402 (source object) to Servers object 404 (target object). In this example, GL 402 includes resources values at $20,000, thus 20% of $20,000 (e.g., $4,000) flows based on allocation rule 406 to Servers 404. Likewise, allocation rule 408 may allocate $2,000 from GL 402 to Storage 410. The other allocation rules in data model 400 allocate 100% of the resource to the next data object: allocation rule 412 directs 100% of the resources (e.g., $4,000) to flow to Support 414; allocation rule 418 directs 100% of the resources in Support (e.g., $4,000) to flow to Business Units 420; and allocation rule 416 directs 100% of the resources from Storage 410 to flow to Business Units 420.

In at least one of the various embodiments, resources that flows into a data object may be allocated among the included resource cost line items. In at least one of the various embodiments, each object may have one or more rules that may describe the assignment ratios for how the resources associate with a data object may be assigned to resource cost line items. For the categories 404, 410, 414, and 420, simple allocation rules assign the resources in the object evenly among the resource cost line items comprising each data object. GL 402 may have different assignment ratios, in this non-limiting example, the assignment ratio between the resource cost line items may be 50% to Payroll, 25% to Taxes, and 25% to Rent.

In at least one of the various embodiments, an assignment ratio may represent how the resources in an organization may be assigned to the actual resource cost line items. In at least one of the various embodiments, rules may be applied that distribute the resources based on formulas that may be defined by the users or administrators who designed the data model. In at least one of the various embodiments, the assignment ratios and allocations may be modified as part of the modeling process.

The data model 400 is a simplified model useful for facilitating discussion and understanding of the embodiments, since allocation rules for models of large organizations can be numerous and complex. However, model 400 is at least sufficient to enable one of ordinary skill in the art to practice what is claimed herein.

Figure 5:
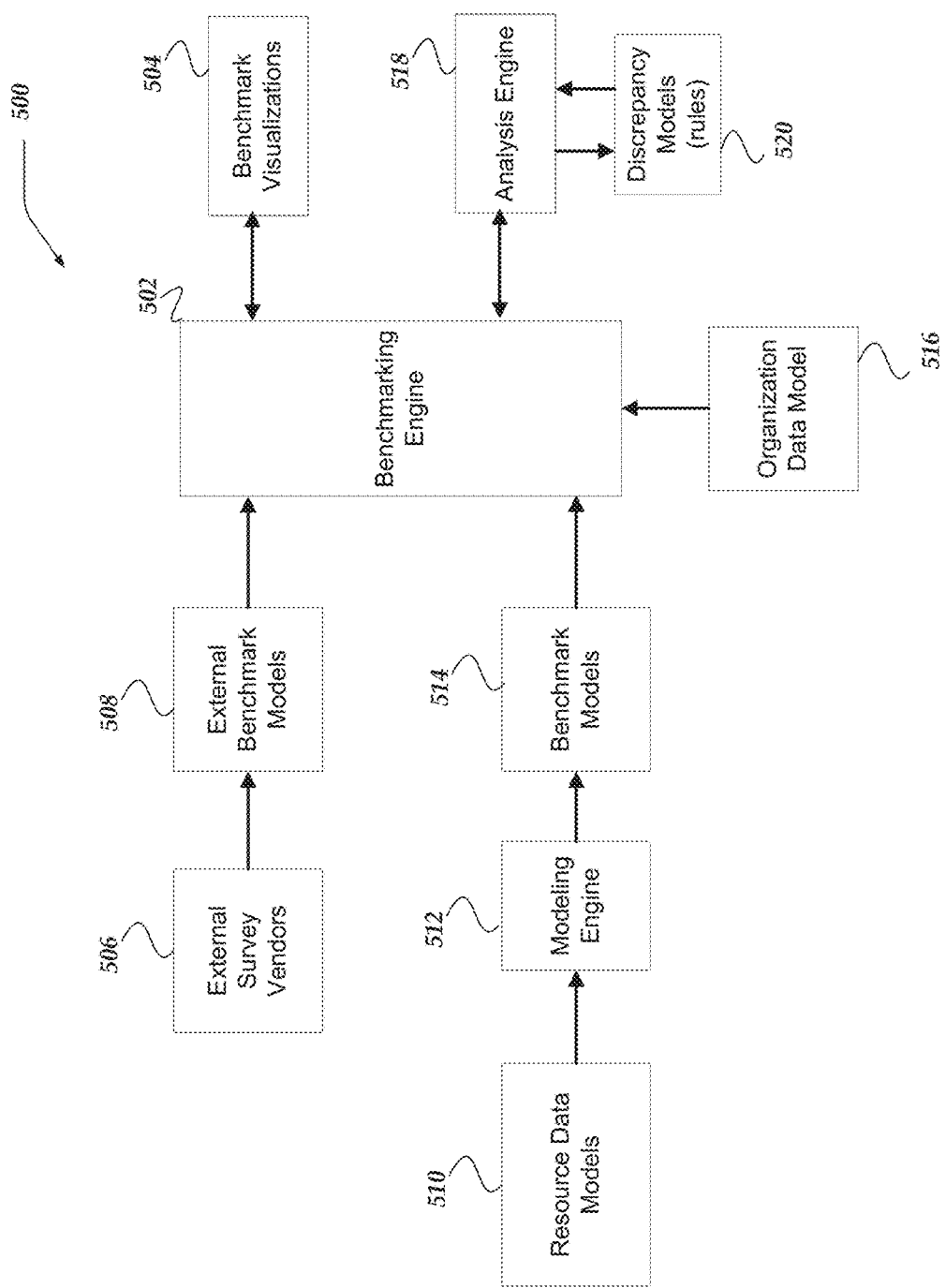
FIG. 5 illustrates a logical architecture of a system for providing models for identifying resource allocation discrepancies in accordance with at least one of the various embodiments.

FIG. 5 illustrates a logical architecture of system 500 for providing models for identifying resource allocation discrepancies in accordance with at least one of the various embodiments. In at least one of the various embodiments, benchmarking engine 502 may be arranged to managed one or more benchmark models associated with resource allocations and/or resource distribution for a universe of organizations.

In at least one of the various embodiments, benchmark visualization engine 504 may be arranged to provide interactive reports that enable visualization of benchmark information in different dimensions.

In at least one of the various embodiments, external information sources, such as, external survey vendors 508 may provide one or more external benchmark models 508 based on the information they may collect by surveying various organizations. However, since the underlying raw information may be proprietary or otherwise confidential, the vendor may provide external benchmark models 508 rather than the raw information used to generate the benchmark models.

In at least one of the various embodiments, one or more resource data model, such as, data models 510 may be provided to a benchmarking modeling engine, such as, benchmark modeling engine 512. Accordingly, in at least one of the various embodiments, benchmark modeling engine 512 may be arranged to transform the data models into one or more benchmark models 514.

In at least one of the various embodiments, benchmarking engine 502 may be arranged to store benchmark models 508 and benchmark model 514 and provide to the visualization engine based on user interactions and/or one or more characteristics of the organization that may be under analysis.

In at least one of the various embodiments, the organizations under analysis may provide data model information 516 to benchmark engine 502. Accordingly, in at least one of the various embodiments, benchmarking engine 502 may be arranged to apply external benchmark model 508 and benchmark models 514 to produce one or more benchmark visualizations 504 that enable a user to analyze an organization. E.g., the organization represented by data model 516.

In at least one of the various embodiments, analysis engine 518 may be arranged to perform various rules based and/or machine learning analysis on the benchmark models, data models, or the like, stored in system 500. In some embodiments, analysis engine 518 may be arranged execute analysis process over some or all of the data model information and/or benchmarking information stored in the system. Accordingly, in some embodiments, analysis may compare data models, benchmark models, or the like, across multiple organizations, industry segments, customers, customer segments, or the like.

In at least one of the various embodiments, analysis engines, such as analysis engine 518 may be provided one or more discrepancy models. In some embodiments, discrepancy models may be employed by analysis engine 518 to identify resource allocation discrepancies. Discrepancy models may include one or more rules heuristic rules that correspond to known and/or common allocation discrepancies. In some embodiments, discrepancy models may be customized to tailor them to a particular customer, industry, organization size, or the like, or combination thereof.

In some embodiments, user feedback and/or machine learning may be employed to modify one or more defined threshold values comprising the rules. Likewise, in at least one of the various embodiments, machine learning and/or user feedback may be employed to modify scores associated with priority, confidence, accuracy, or the like, of the rules and/or discrepancy models.

Figure 6:
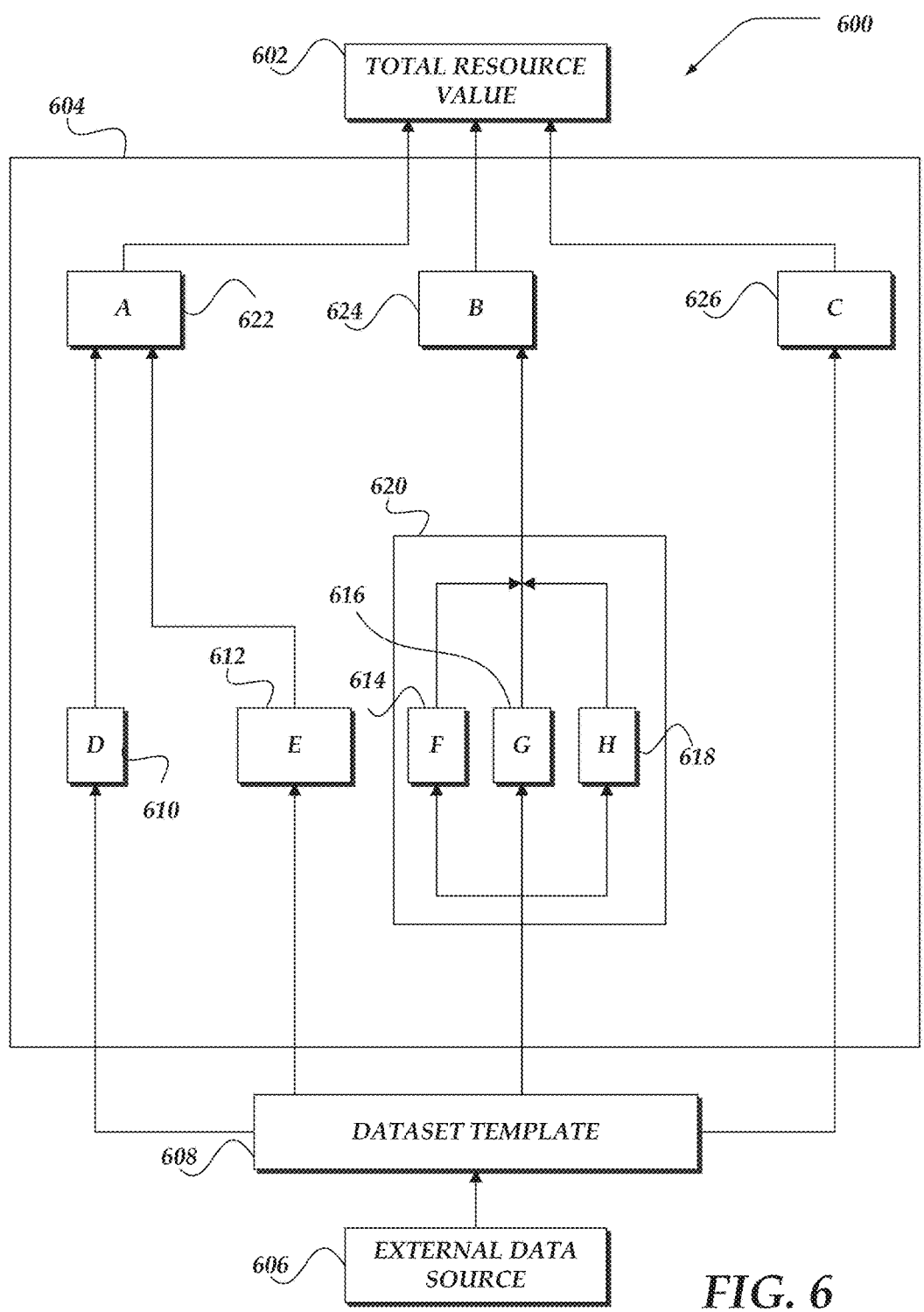
FIG. 6 illustrates an overview of a data model for providing total resource allocation value for a system.

FIG. 6 illustrates an overview of data model 600 for providing total resource allocation value 602 for a system, such as a business organization. Data source 606 provides a dataset to fields of dataset template 608. At least some of the fields of dataset template 608 normalize the provided dataset. Model template 604 is arranged to map the normalized data in the fields of dataset template 608 to a plurality of data object, including data objects 610, 612, 614, 616, 618, 611, 624, and 626. Also, although not shown, each object may be associated with one or more allocation rules so that allocated percentages of the normalized data set are distributed to the plurality of data objects based on their associated allocation rules.

Additionally, some of the objects may be aggregated into other data objects. For example, objects 610 and 612 may be aggregated into summing object 622. Also, as shown, objects 614 and 616 and 618 may be aggregated together at block 620 and then further allocated to summing object 624. Further, as shown, some portion of the normalized dataset may be allocated directly to summing object 626. The summing objects may then be allocated by allocation rules to provide total resource allocation value 602.

Furthermore, although not shown, in at least one of the various embodiments, data model 600 may be edited to include additional analysis, such as recommendations, simulations, benchmarks, or the like. For example, historical information from other models and heuristics used by other anonymous systems using the same resource may be employed at least in part to analyze and compare the current model and suggest changes to that model that may be less costly in providing a total resource value for the current system.

Figure 7:
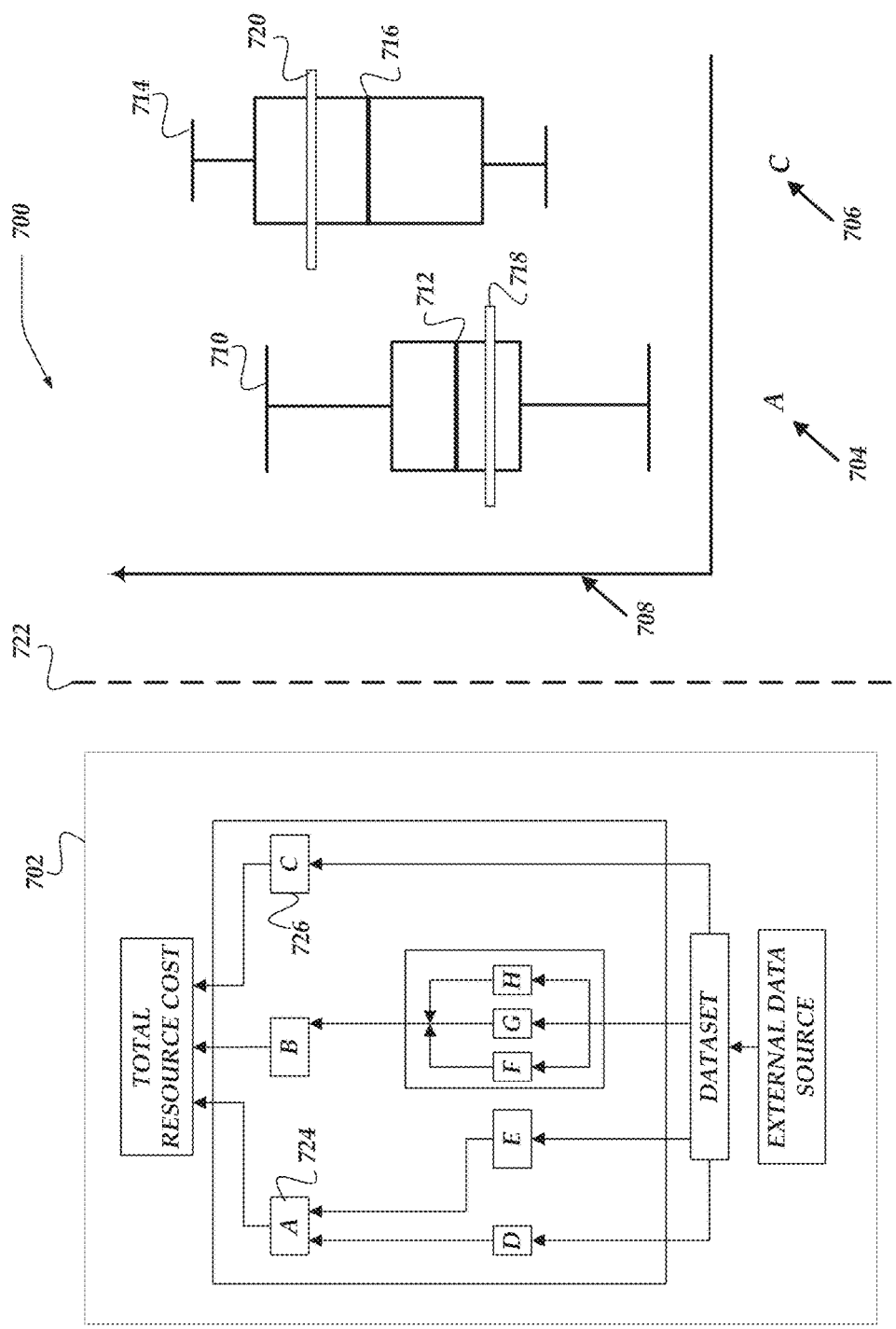
FIG. 7 illustrates a logical transformation a data model into one or more benchmark models in accordance with at least one of the various embodiments.

FIG. 7 illustrates a logical transformation a data model into one or more benchmark models in accordance with at least one of the various embodiments. In at least one of the various embodiments, data models, such as, data model 702 may be processed by a benchmark modeling engine and/or benchmarking engine (here logically representing by line 722) into benchmark models.

In at least one of the various embodiments, benchmark modeling engines may be arranged to take one or more data models and provide a plurality of benchmark models based on the data models and their underlying data. In this example, resource allocations associated with data object 724 and data object 726 are modeled using benchmark model 704 and benchmark model 706. In at least one of the various embodiments, benchmark models may include various other values/markers produced from the underlying data models. In this example, box plots are displayed to represent the benchmark models. In other embodiments, other representation may be used depending on the model point that the benchmarking engine may be configured or arranged to provide.

In at least one of the various embodiments, benchmarking engine may be arranged to provide benchmark models that a universe of resource allocation information grouped and/or sliced into various dimensions. In this example, axis 708 may represent the measure of resources allocated for a particular data object class and/or category. Accordingly, in some embodiments, model point 710 may represent a high water mark for allocations associated with data object 724. Likewise, in at least one of the various embodiments, model point 714 may represent the high water mark of resource allocations associated with data object 726. In at least one of the various embodiments, model point 712 and model point 716 may represent median scores for resource allocations associated with data object 724 and data object 726 respectively.

Also, in at least one of the various embodiments, a benchmarking engine may provide the actual resource allocation value for one or more organizations that may be under analysis. In this example, model point 718 may represent the actual resource allocation associated with data object 724 for an organization that is being analyzed. Likewise, in this example, model point 720 may represent the actual resource allocation associated with data object 726 for the organization being analyzed.

In at least one of the various embodiments, the benchmark engine may provide benchmark models that may be arranged based on one or more selected dimensions. In some embodiments, the models may be generated and/or selected based on one or more characteristics of other organizations that may be incorporated into the benchmark models used for analyzing the organization. For example, the benchmark models may be filtered based on revenue, industry, asset volumes, geographic region, or the like, or combination thereof. Accordingly, in at least one of the various embodiments, a user may choose to analyze an organization by comparing its resource allocations to benchmark models that correspond to organizations having a selected revenue range, geographic location, or of a particular industry.

Figure 8:
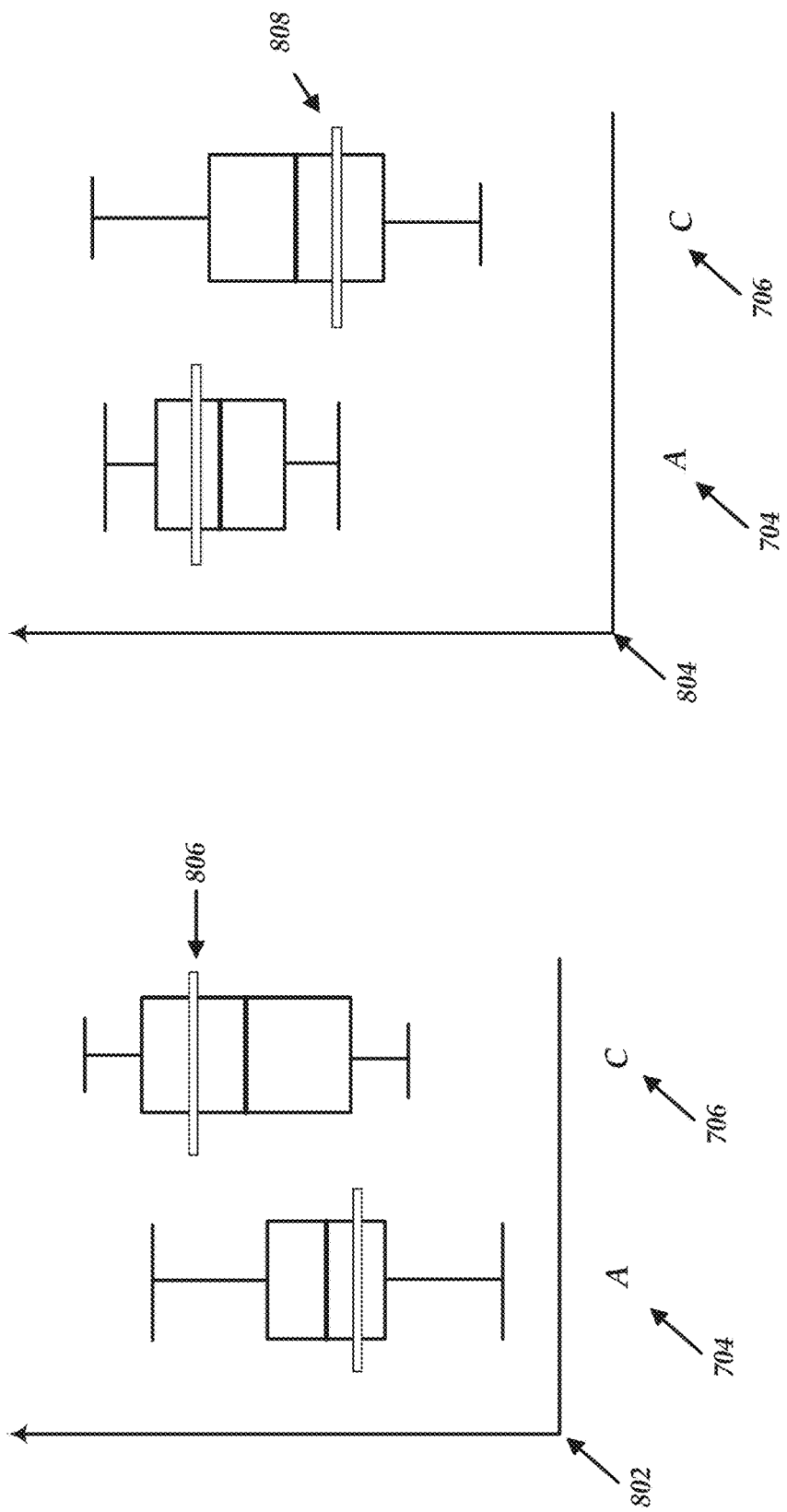
FIG. 8 illustrates a logical representation of benchmark models in accordance with at least one of the embodiments.

FIG. 8 illustrates a logical representation of benchmark models in accordance with at least one of the embodiments. In this example, benchmark models are provided based on different clusters or categories of organizations. Here, in this example, the same data objects as shown in FIG. 7 may be assumed. Accordingly, benchmark model 704 corresponds to data object 724 and benchmark model 706 corresponds to data object 726.

In at least one of the various embodiments, the models may be provided to represent different types of allocations and/or allocation measurements. Accordingly, in this view, axis 802 and axis 804 may represent different representations of resource values.

In at least one of the various embodiments, the organizations actual resource allocation for a data object may compare differently to different benchmark models. In this example, if benchmarking criteria 802 is used, model point 806 is shown to be above the median value, indicating the resource allocations associated data object 726 may be higher than expected given the current benchmark view. Likewise, if benchmark view 804 is examined, the same data object for the same data organization may be discovered to be below the median value.

Accordingly, in at least one of the various embodiments, a benchmarking engine may be arranged to provide benchmark models representing difference characteristics of the universe of data models used to the produce the benchmark models. In some embodiments, external benchmark models provided by external vendors may be defined to be associated with one or more characteristics of their underlying data. In contract, in some embodiments, the benchmarking modeling engine and/or benchmarking engine may be arranged to access additional characteristics used by the data models (e.g., resource data models 510) since the underlying raw data may be available.

Figure 9:
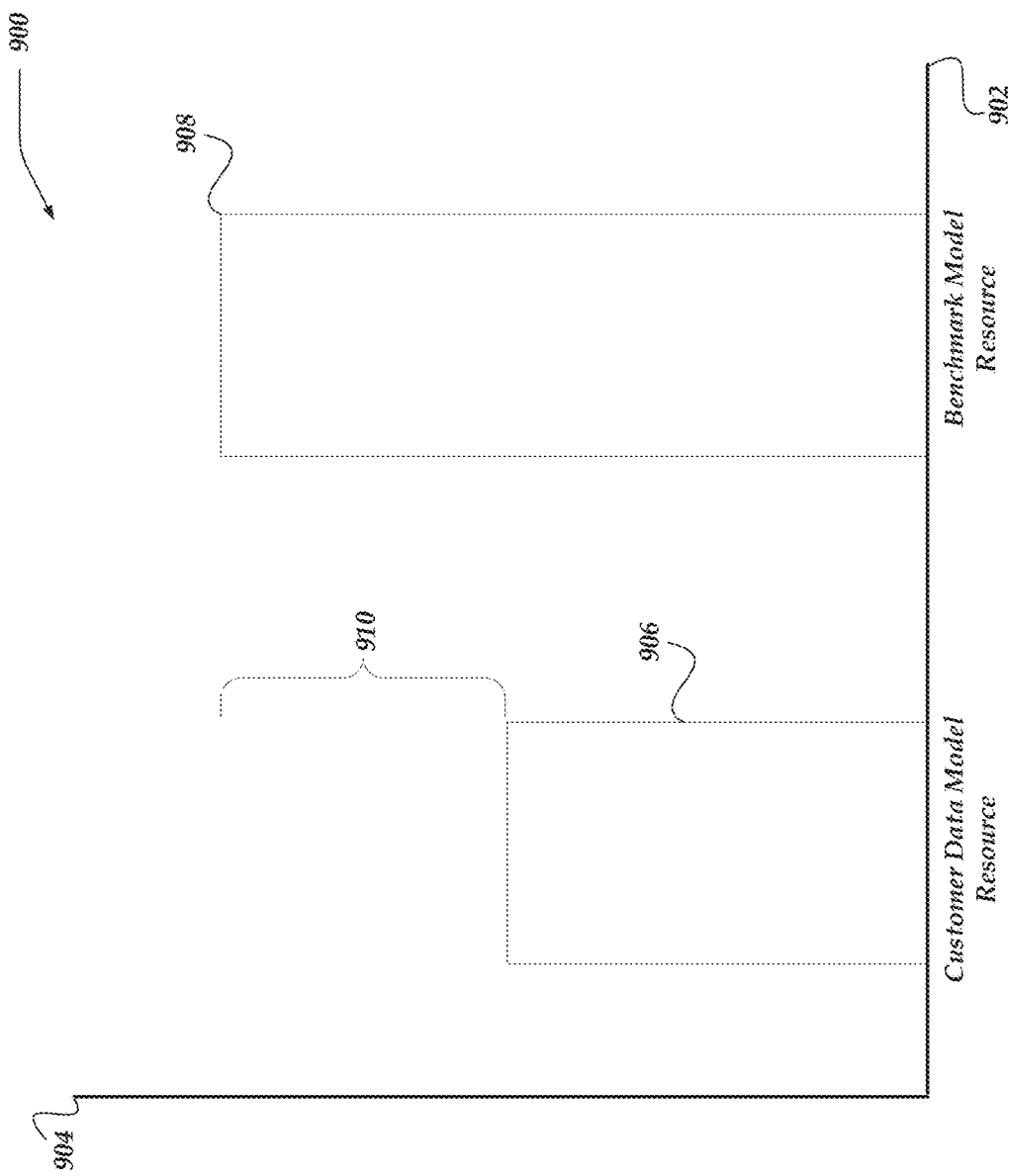
FIG. 9 illustrates a logical representation of a discrepancy model in accordance with at least one of the various embodiments.

FIG. 9 illustrates a logical representation of discrepancy model 900 in accordance with at least one of the various embodiments. In at least one of the various embodiments, discrepancy models may be employed by an analysis engine, such as analysis engine 326 for identifying resource allocation discrepancies. In this example, axis 902 represents discrete resource types, in this case, a customer data model resource (from a customer data model) and a benchmark model resource. Likewise, in this example, axis 904 may represent a resource quantity, such as cost, time, kilowatt hours, or the like.

In at least one of the various embodiments, discrepancy model 900 compares customer data model resource value 906 with benchmark model resource value 908. In this example, discrepancy value 910 represent a difference between the customer's value and the corresponding benchmark value.

In at least one of the various embodiments, discrepancy rules may be defined to determine if a discrepancy value should be considered noteworthy. In some embodiments, a rule may be defined such that if discrepancy value 910 exceeds a defined value the customer should be notified of the discrepancy. For example, in some embodiments, if customer data model resource value 906 shows that a customer is consuming 100 Kilowatt hours per employee and benchmark model value 908 shows that the industry mean is 1500 Kilowatt hours per employee, a rule may be defined to indicate that there is a discrepancy in the customer's data model. Accordingly, the customer may be notified that there may be problem of some kind associated with the data model and/or their operations.

Note, in some cases, the discrepancy may occur because the customer's data model or one or more inputs may be incorrect rather than the customer over or under utilizing a resource. For example, in some embodiments, if the benchmark model indicates that the mean resource costs per unit of desktop computers is $1000 and the customer's data model reports $1,000,000 per desktop computer, the analysis engine will report the discrepancy. However, the source of the discrepancy may be caused because the customer knows (or can easily determine) how much they pay for desktop computers but they may not know how many they have.

Accordingly, a correct entry for total resource costs combined with an improper unit count may cause discrepancy to be reported.

In at least one of the various embodiments, discrepancy models may be arranged to analyze compare different resource allocations to identify discrepancies. For example, in some embodiments, an analysis of benchmark models may indicate that if resource A consume X resources then resource B should consume Y resources values. Accordingly, if an organization sufficiently deviates from this model, a discrepancy may be raised. For example, in some embodiments, benchmark models may indicate that organizations that allocate $10,000,000 to cloud compute resources also allocate $8,000,000 to $12,000,000 to cloud data storage resources. Accordingly, in this example, a notification may be reported for organizations that may identified by this discrepancy model.

Also, in at least one of the various embodiments, analysis may be applied across difference sub-organization (e.g., business units) of a larger organization. For example, different departments in the same company may for non-obvious reasons have significant resource allocation discrepancies. Accordingly, in this example, one department may have a significantly (as per a given discrepancy rule) lower resource cost allocation than other similar departments. Notification of the discrepancy may enable responsible stakeholders to take appropriate action to resolve the discrepancy.

In at least one of the various embodiments, the particular definition of discrepancy models and/or their included rules may vary depending on various characteristics of the organization being analyzed. In some embodiments, some discrepancy rules may be more generally applicable than others. Also, organizations may design customized by rules that target their own expectations. For example, an organization that is trying to aggressively grow its market share may arrange one or more rules that expect allocations for certain resources to exceed benchmark values.

Also, in at least one of the various embodiments, analysis engine may be arranged to incorporate local or global user feedback to adjust threshold values. For example, if certain discrepancy rules may continually indicate discrepancies that users mark as no-concern, the analysis engine may be arranged to gradually modify the threshold values to reduce the number of irrelevant discrepancy notifications.

Figure 10:
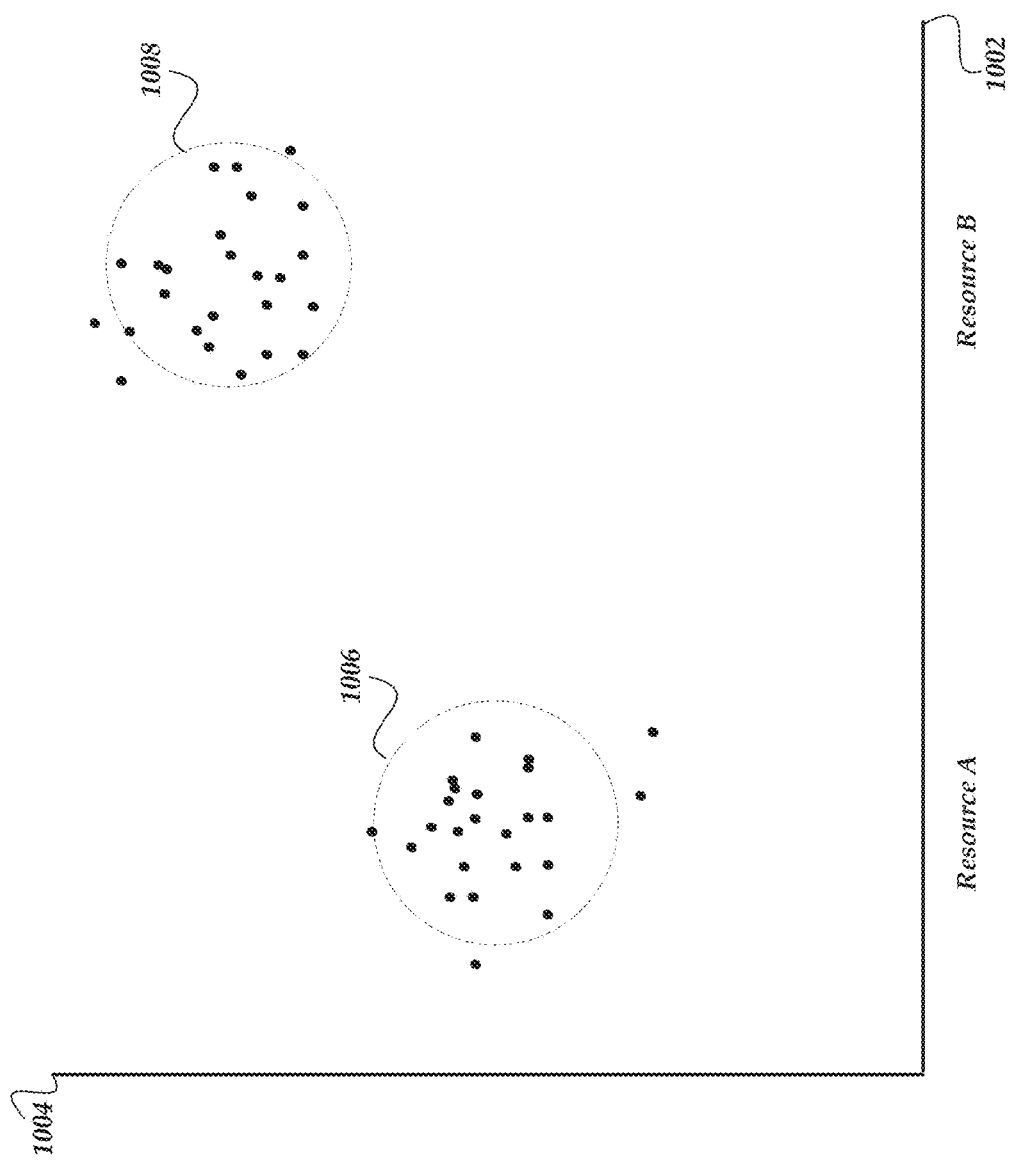
FIG. 10 illustrate a logical representation of correlations that may be discovered by an analysis engine in accordance with at least one of the embodiments.

FIG. 10 illustrate a logical representation of correlations that may be discovered by an analysis engine in accordance with at least one of the embodiments. In some embodiments, the analysis engine may be arranged to process customer data models and/or benchmark models to discover relationships between different resources. In this example, axis 1002 represents discrete resources and axis 1004 represents resource values and/or resource allocation values. Accordingly, in this example, a relationship between resource A and resource B may exist as indicated by cluster 1006 and cluster 1008. Accordingly, in some embodiments, an analysis engine may be arranged to discover non-obvious relationships between difference resources. One or more data analysis techniques may be employed to identify hidden/non-obvious relationship, including, clustering, linear regression, or the like.

Generalized Operations

FIGS. 11-14 represent the generalized operations for models for visualizing resource allocation in accordance with at least one of the various embodiments. In at least one of the various embodiments, processes 1100, 1200, 1300, and 1400 described in conjunction with FIGS. 11-14 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 11-14 may be operative in resource modeling and analysis for identifying resource allocation discrepancies such as described in conjunction with FIGS. 4-10.

Figure 11:
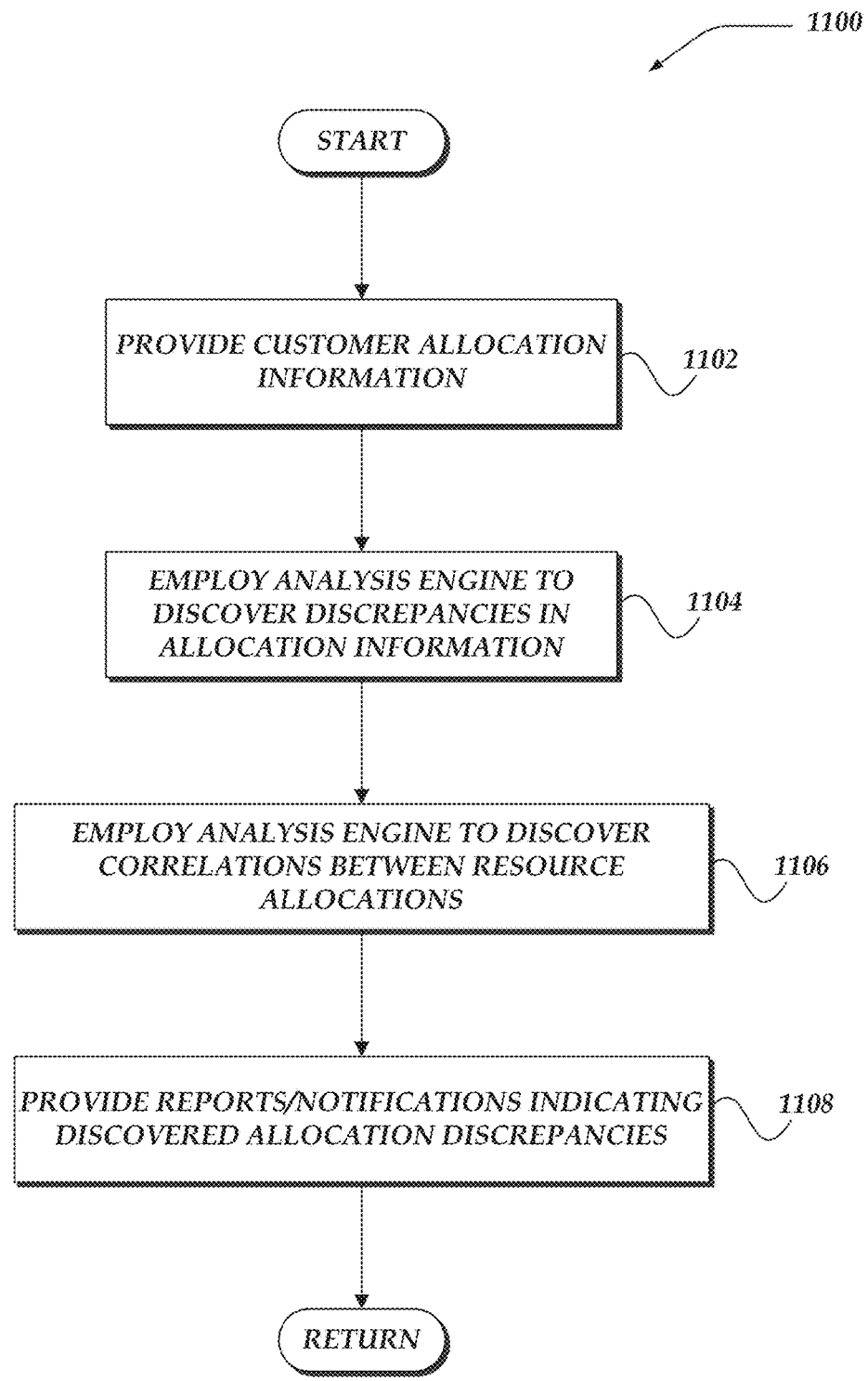
FIG. 11 illustrates an overview flowchart for a process for identifying resource allocation discrepancies in accordance with at least one of the various embodiments.

FIG. 11 illustrates an overview flowchart for process 1100 for identifying resource allocation discrepancies in accordance with at least one of the various embodiments. After a start block, at block 1102, in at least one of the various embodiments, customer allocation information may be provided. In at least one of the various embodiments, customers may be organizations that may be employing the system for resource allocation modeling, or the like. Accordingly, in some embodiments, allocation information may include dataset information used for generating data models. In other cases, allocation information may be the data models themselves. Generally, this may be information that represents resource allocation used for the customer. In some cases, this information may be actual information provided in real-time (e.g., sales information), historical information (e.g., last quarter's resource allocation values), forecasted allocation information, or the like.

At block 1104, in at least one of the various embodiments, an analysis engine may be employed to discover discrepancies in the resource allocation information provided by the customer. In at least one of the various embodiments, the analysis engine may be arranged continuously process customer resource allocation information, such as data models to compare their values to one or more relevant benchmark models. In some embodiments, analysis engine may be arranged to process customer data models at defined intervals. In at least one of the various embodiments, processing by the analysis engine may be initiated by user input.

In at least one of the various embodiments, the analysis engine may be arranged to employ one or more discrepancy models during processing to identify discrepancy in customer data models and/or resource allocation information. In at least one of the various embodiments, one or more discrepancy models may be applied globally while other discrepancy models may be associated with particular customers and/or data models.

At block 1106, in at least one of the various embodiments, the analysis engine may be arranged to discover correlations across various resource allocations for different model objects, data models, customer segments, user segments, or the like. In at least one of the various embodiments, these correlations may be based on one or more of data models, customer data, other customers data, benchmark models, or the like, or combination thereof.

At block 1108, in at least one of the various embodiments, one or more reports and/or notifications indicating the presence or absence of discrepancies in the customer's resource allocations may be provided. In at least one of the various embodiments, reports may be interactive user interfaces that highlight discovered discrepancies. In some embodiments, users may be enabled to drill down into portions of the report to view the underlying model objects, allocation information, assignment ratios, raw dataset records, or the like, or combination thereof.

In at least one of the various embodiments, one or more notifications corresponding to identified discrepancies may be provided to one or more users. In at least one of the various embodiments, notifications may be provided using various communication methods, such as email, SMS text messages, push notifications, displaying in a user-interface, or the like, or combination thereof. In some embodiments, users may be enabled to rate or score the relevance of notifications providing feedback to the analysis engine regarding the relevancy/priority of the associated discrepancies. Next, control may be returned to a calling process.

Figure 12:
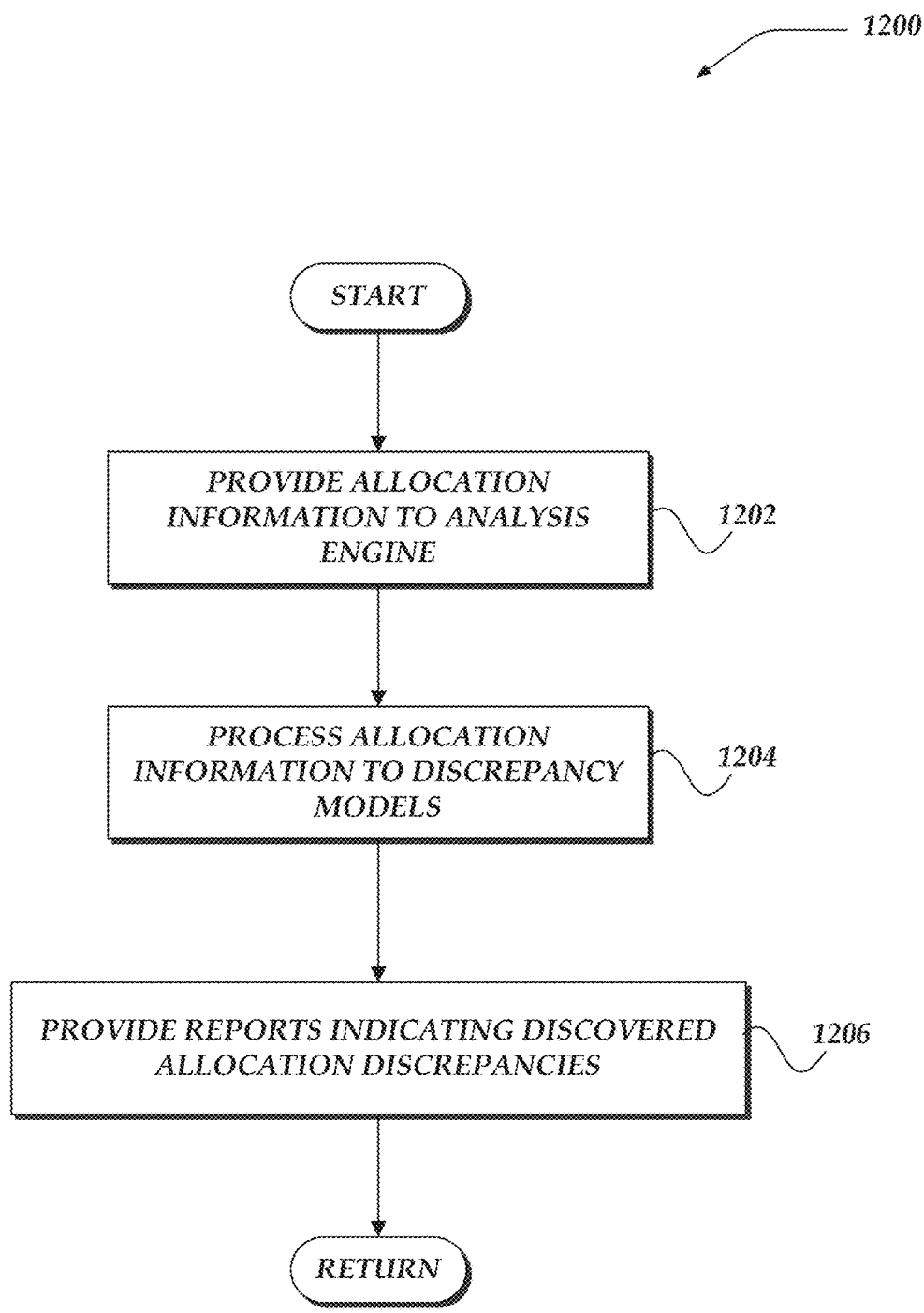
FIG. 12 illustrates an overview flowchart for a process for identifying resource allocation discrepancies using discrepancy models in accordance with at least one of the various embodiments.

FIG. 12 illustrates an overview flowchart for process 1200 for identifying resource allocation discrepancies using discrepancy models in accordance with at least one of the various embodiments. After a start block, at block 1202, in at least one of the various embodiments, resource allocation information may be provided to an analysis engine. At block 1204, in at least one of the various embodiments, the analysis engine may be arranged to process allocation information using one or more discrepancy models. At block 1206, in at least one of the various embodiments, one or more reports that may indicate one or more discovered discrepancies may be provided. Next, control may be returned to a calling process.

Figure 13:
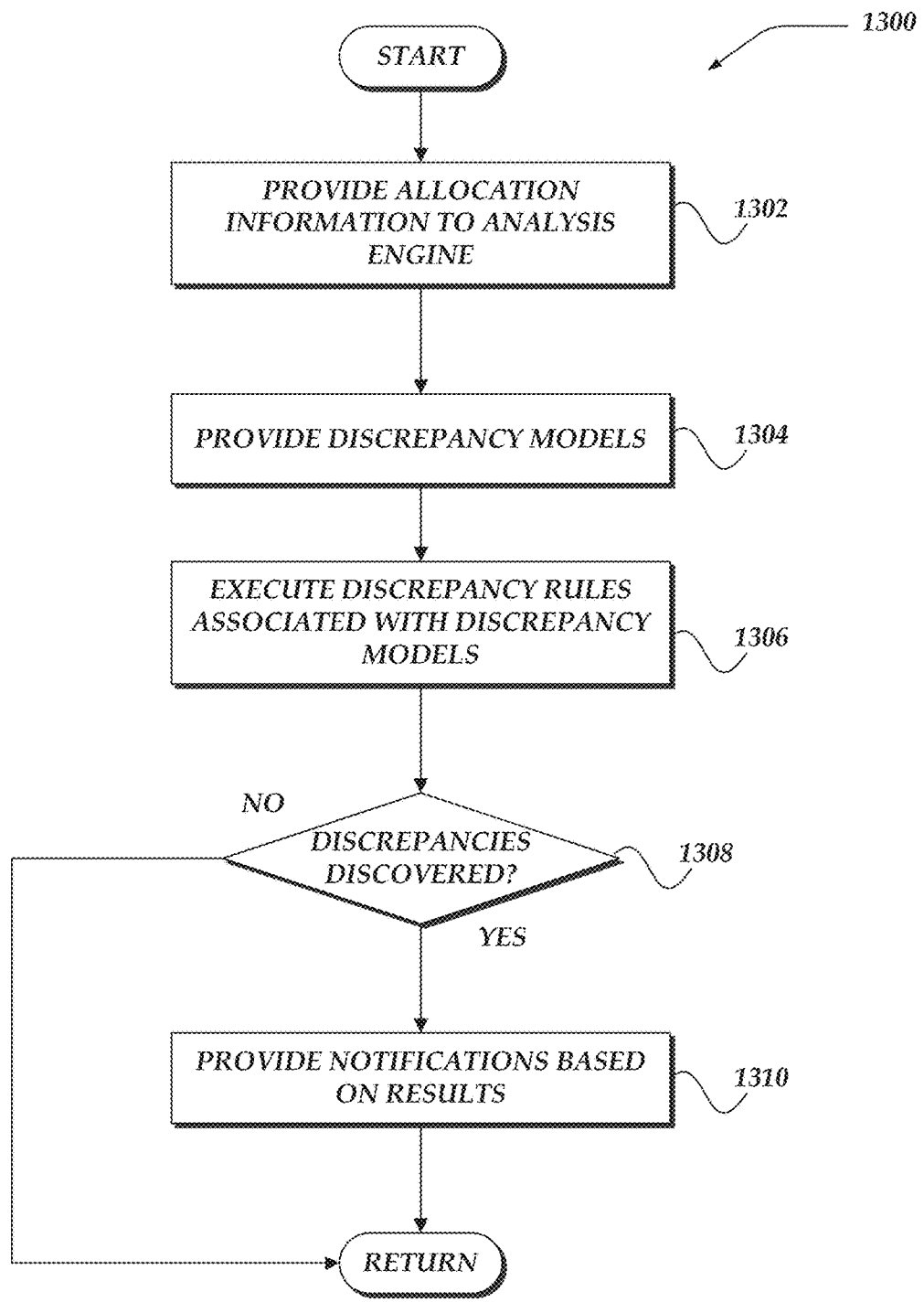
FIG. 13 illustrates an overview flowchart for a process for identifying resource allocation discrepancies using discrepancy models in accordance with at least one of the various embodiments.

FIG. 13 illustrates an overview flowchart for process 1300 for identifying resource allocation discrepancies using discrepancy models in accordance with at least one of the various embodiments. After a start block, at block 1302, in at least one of the various embodiments, allocation information may be provided to the analysis engine. In at least one of the various embodiments, the analysis engine may be arranged to traverse customer data models to select model object to analyze.

At block 1304, in at least one of the various embodiments, one or more discrepancies models may be provided. In at least one of the various embodiments, discrepancy models may be data structures that include one or more discrepancy rules, threshold values, efficacy scores, custom prioritization information, or the like. These models may be arranged to be generally applicable, such that they may be applied to more than one customer. Some discrepancy models may be targeted for particular types of customers/organizations. In some embodiments, there may be one or more rules that are applicable for certain types of companies and not applicable for others. For example, the resource allocation for information technology in manufacturing companies may be significantly different than IT resource allocation for cloud-based social media companies. Accordingly, in at least one of the various embodiments, users may design different discrepancy models for different categories or segments of customers.

Likewise, in at least one of the various embodiments, different discrepancy models may be arranged to target discrepancies in resource allocations for different types of resources. For example, in some embodiments, data models and/or benchmark models for energy allocation, storage allocation, cost allocation, or the like, may be significantly different. Accordingly, the discrepancy models may be different as well.

However, in at least one of the various embodiments, general discrepancy models that include rules to discover discrepancies based on data models deviating from benchmark models may be generalized to provide default discrepancy discovery. For example, in some embodiments, a generic discrepancy model may look for allocations that vary from benchmark model values by +/−20%. Accordingly, in this example, the generic discrepancy model may flag each model object value that deviates from the benchmark mean value for the corresponding benchmark object.

In at least one of the various embodiments, discrepancy models may be arranged in a cascading hierarchy such that more specifically targeted discrepancy models may supersede less specifically targeted discrepancy models. For example, discrepancy models associated with a particular customer may supersede or override generic discrepancy models or those models associated with a particular industry segment, or the like.

Also, in some embodiments, a priority based hierarchy of discrepancy models may be defined, such that discrepancy models with higher priority may be used before lower priority discrepancy models.

In at least one of the various embodiments, the analysis engine may be arranged to traverse customer data models to select model object to analyze. Accordingly, in some embodiments, the selected model objects may be compared against corresponding benchmark objects. In at least one of the various embodiments, the comparison may be performed by executing one or more discrepancy rules associated with the one or more discrepancy models.

At block 1306, in at least one of the various embodiments, the analysis engine may be arranged to execute the one or more discrepancy rules. In at least one of the various embodiments, each discrepancy models may include one or more discrepancy rules. These rules may be applied to discover discrepancies in a customer's data model.

In at least one of the various embodiments, similar to discrepancy models, the rules may be associated with priority values and/or cascading priority. Accordingly, in some embodiments, rules having a higher priority may be executed before or in the exclusion of other rules in the discrepancy models.

In at least one of the various embodiments, there may be compound rules that combine more than one rule to discover discrepancies. For example, two rules may be defined such that both rules need to be matched to signal a discrepancy. Further, in some embodiments, compound discrepancy rules may be defined such that they test allocation values for than one model object to determine a result. For example, a compound rules may be arranged to test values from a desktop computer model object and an employee model object to determine discrepancies. In this example, a per unit cost for desktop computer may be expected to be lower as the number of employees increase. Accordingly, a compound discrepancy rule may be defined to evaluate desktop unit cost and number of employees to determine if a discrepancy is present.

In at least one of the various embodiments, discrepancy rules may be arranged to include substitutable variables for threshold values. For example, a rule may be arranged such as:

if Model-Object-Value is greater than X then raise a discrepancy

Accordingly, a discrepancy model may supply the values for Model-Object-Value and X to the analysis engine if the rule is executed.

In at least one of the various embodiments, discrepancy rules may be defined using one or more programming/scripting languages, such as Javascript, Ruby, Python, C, C++, or the like. Also, in some embodiments, declarative languages, such as XML, JSON, or the like, may be used to define rules. Also, some rules may be "built-in" into the analysis engine enabling discrepancy models to be composed of a combination of built-in rules and/or custom rules.

In at least one of the various embodiments, subject matter experts may design one or more discrepancy rules deemed applicable to a customer and/or class of customers. Also, in some embodiments, rules may be customized for a particular customer. For example, some customers may deliberately want to allocate some resources out-of-line with benchmark models. In such cases, customer rules may be created or threshold values for existing rules may be modified to account to for the customers' expectations.

At decision block 1308, in at least one of the various embodiments, if discrepancies are discovered, control may flow to block 1310; otherwise, control may be returned to a calling process. In at least one of the various embodiments, the analysis engine may be arranged to apply one or more discrepancy rules. Accordingly, each rule may discover or identify one or more discrepancies in the customers data model and/or allocation information.

At block 1310, in at least one of the various embodiments, one or more notifications may be provided based on the discovered discrepancies. In at least one of the various embodiments, if the analysis engine identifies one or more discrepancies, it provides one or more notifications, reports, alerts, or the like, or combination thereof, to one or more responsible users. In some embodiments, discrepancy models may be arranged include configuration information define notification information, such as, priority, type, responsible users, impacted model object, resource type, or the like. In some cases, logging the discovering of the discrepancy may be sufficient. In other cases, notifications may be provided directly to responsible parties. In some embodiments, notification information may be provided to other external services, such as, trouble ticket/customer service systems that may be responsible for performing the appropriate actions in response to receiving discrepancy notifications. Next, control may be returned to a calling process.

Figure 14:
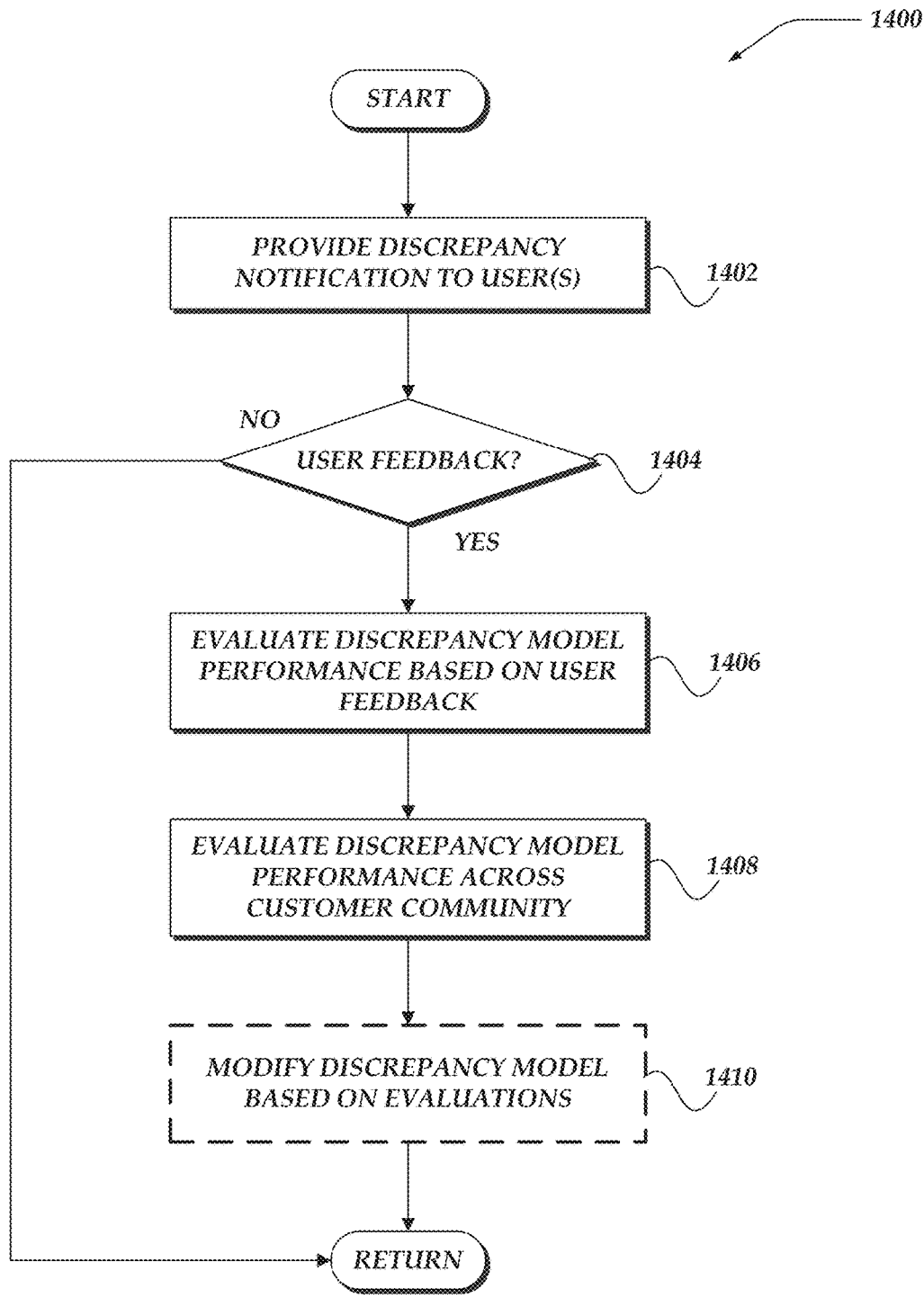
FIG. 14 illustrates a flowchart for a process for training discrepancy rules and discrepancy models based on user and community feedback in accordance with at least one of the various embodiments.

FIG. 14 illustrates a flowchart for process 1400 for training discrepancy rules and discrepancy models based on user and community feedback in accordance with at least one of the various embodiments. After a start block, at block 1402, in at least one of the various embodiments, discrepancy notifications may be provided to one or more users. In at least one of the various embodiments, as described above an analysis engine may provide various notifications to various users regarding discovered discrepancies in customers data models and/or allocation information.

In at least one of the various embodiments, the analysis engine may be arranged to provide a user-interface that enable users to provide feedback regarding the various discrepancy notifications they may be provided.

In at least one of the various embodiments, feedback may include scores or ranking of whether the reported discrepancy was relevant and/or useful to the user/customer. Also, in some cases the feedback may include freeform notes, comments, suggestions, or the like. In some embodiments, the feedback user-interface may provide a facility so users can record and/or review how discrepancies may have been resolved.

At decision block 1404, in at least one of the various embodiments, if the one or more users provide feedback regarding the discrepancy notification, control may flow to block 1406; other control may be returned to a calling process. In at least one of the various embodiments, the analysis engine may be arranged to store feedback from users for future analysis.

At block 1406, in at least one of the various embodiments, the performance of the discrepancy models associated with the discrepancy notifications may be evaluated based on user feedback. In at least one of the various embodiments, the analysis engine may be arranged to analyze user feedback to determine how effective one or more discrepancy models may be performing. Discrepancy models may be evaluated to determine their relevancy with respect to a customer. Accordingly, in some embodiments, even though discrepancy models may be operating correctly, the discrepancies they identify may be deemed irrelevant (or less relevant) by the user. For example, users may deliberately allocate less resources to a model object than suggested by a benchmark model. Accordingly, repeated notification of this discrepancy may be considered irrelevant by the user.

Likewise, in at least one of the various embodiments, other discrepancies may be considered critical or more important by a user. Accordingly, feedback associated with such notifications may indicate that the user deems the notifications to be high priority and/or important.

At block 1408, in at least one of the various embodiments, discrepancy models performance may be evaluated across the customer community. In at least one of the various embodiments, the analysis engine may be arranged to analyze user feedback across some or all of the customers. Accordingly, it may be arranged to determine feedback trends that extend beyond a single customer and/or user.

Also, in some embodiments, the analysis engine may be arranged to perform segmented analysis across different categories of customers/organizations. In this way, the analysis engine may uncover relationships/trends on a per segment basis. For example, analysis of customers grouped by industry may discover trends that may be significant for one industry and not another. Similarly, segmented analysis may confirm that one or more trends may occur independently in segments of customers.

Further, in some embodiments, if sufficient user information is available, the analysis engine may be arranged to analyze how different user segments respond to discrepancy notifications. For example, executives may respond (e.g., score) notifications differently than information technology personnel. Accordingly, if differences among user segments may be discovered, the analysis engine may modify the type and/or number of notifications sent to a user based on which user segment they are in. For example, one segment of users may be discovered as having a tendency to mark/score certain discrepancy notifications as non-interesting/not-relevant while other segments of users indicate that the discrepancy notifications are important/relevant. Thus, in this example, the analysis engine may reduce the number or de-prioritize notifications for one user segment while increasing and/or prioritizing notification for other user segments.

At block 1410, in at least one of the various embodiments, the one or more discrepancy models associated with the discrepancy notifications may be modified based one local and/or global evaluations. In at least one of the various embodiments, threshold values included in one or more discrepancy models and/or one or more of their included discrepancy rules may be modified based on the analysis of the user feedback. Accordingly, in some embodiments, if users minimize the importance or relevancy to a discrepancy rules, threshold values for triggering/satisfying the rules may be increased or decreased to reflect users lack of interest in the underlying discrepancy. For example, if a rule tests that a resource allocated to a model object should be within 20% of a correspond benchmark value, the threshold values may be modified to require the allocation to be within 30% of the benchmark value. In at least one of the various embodiments, rules and/or threshold values may be associated with a stepping function that increases or decreases the threshold values according to set amounts. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The invention claimed is:

1. A method for identifying allocation discrepancies using a network computer that employs one or more processors to execute instructions that perform actions, comprising:
    instantiating a resource modeling engine to perform actions, including:
        providing a plurality of data models and a plurality of benchmark models to a separately instantiated analysis engine, wherein the plurality of data models are each comprised of two or more nodes and one or more edges from a memory that is configured and arranged to store the plurality of data models, and wherein each node represents a model object and each edge represents a resource allocation; and
        providing one or more discrepancy models to the analysis engine, wherein each discrepancy model includes one or more rules, wherein the analysis engine is employed to search for discrepancies in the plurality of data models based on the one or more discrepancy models and the plurality of benchmark models; and
    instantiating a visualization engine to use one or more discrepancies that are identified by the analysis engine to perform further actions, including:
        providing one or more notifications to one or more users, wherein geolocation information based on electronic signals processed by a Global Positioning System (GPS) device is employed to improve understanding of a visual display for one or more users by modifying the visual display of the notifications based on a location of a client computer employed by the one or more users, wherein the modification includes one or more of time zone, currency, calendar format, or language and, wherein the resource modeling engine modifies the one or more discrepancy models based on subsequent feedback provided by the one or more users in the visual display and also employs the one or more of time zone, currency, calendar format, or language to modify one or more of a user interface, a report, an internal process, or a database.

2. The method of claim 1, wherein the one or more rules include one or more threshold conditions that correspond to a discrepancy in the plurality of data models.

3. The method of claim 1, further comprising:
    employing the analysis engine to traverse one or more data models of the plurality of data models;
    providing one or more model objects based on the traversal of the one or more data models; and
    identifying the one or more discrepancies based on an execution of one or more rules, wherein the execution compares one or more threshold values in the one or more rules to resource allocation values associated with the one or more model objects.

4. The method of claim 1, further comprising:
    traversing one or more data models associated with one or more customers;
    traversing one or more other data models associated with one or more other customers;
    executing the one or more rules to compare one or more model objects from the one or more data models and one or more other model objects from the one or more other data models; and
    identifying one or more discrepancies based on one or more affirmative results of the comparison.

5. The method of claim 1, further comprising:
    traversing one or more data models associated with one or more industry segments to provide one or more model objects;
    executing one or more rules to compare the one or more model objects, wherein the one or more compared model objects are associated with separate industry segments; and
    identifying one or more discrepancies based on one or more affirmative results of the comparison.

6. The method of claim 1, wherein identifying the one or more discrepancies based on the execution of the one or more rules, further comprises, comparing one or more resource allocation values associated with one or more model objects in a data model with a mean resource allocation value that is associated with one or more corresponding benchmark objects.

7. The method of claim 1, further comprising:
    traversing the plurality of data models to identify clusters of resource allocation values associated with the one or more model objects;
    identifying one or more correlations in the resource allocation values based on machine learning that includes one or more of linear regression, or deep learning neural networks; and providing one or more additional discrepancy models based on the one or more identified correlations.

8. A processor readable non-transitory storage media that includes instructions for identifying allocation discrepancies, wherein execution of the instructions by one or more hardware processors performs actions, comprising:
instantiating a resource modeling engine to perform actions, including:
providing a plurality of data models and a plurality of benchmark models to a separately instantiated analysis engine, wherein the plurality of data models are each comprised of two or more nodes and one or more edges from a memory that is configured and arranged to store the plurality of data models, and wherein each node represents a model object and each edge represents a resource allocation; and
providing one or more discrepancy models to the analysis engine, wherein each discrepancy model includes one or more rules, wherein the analysis engine is employed to search for discrepancies in the plurality of data models based on the one or more discrepancy models and the plurality of benchmark models; and
instantiating a visualization engine to use one or more discrepancies that are identified by the analysis engine to perform further actions, including:
providing one or more notifications to one or more users, wherein geolocation information based on electronic signals processed by a Global Positioning System (GPS) device is employed to improve understanding of a visual display for one or more users by modifying the visual display of the notifications based on a location of a client computer employed by the one or more users, wherein the modification includes one or more of time zone, currency, calendar format, or language and, wherein the resource modeling engine modifies the one or more discrepancy models based on subsequent feedback provided by the one or more users in the visual display, wherein the resource modeling engine modifies the one or more discrepancy models based on subsequent feedback provided by the one or more users in the visual display and also employs the one or more of time zone, currency, calendar format, or language to modify one or more of a user interface, a report, an internal process, or a database.

9. The media of claim 8, wherein the one or more rules include one or more threshold conditions that correspond to a discrepancy in the plurality of data models.

10. The media of claim 8, further comprising:
employing the analysis engine to traverse one or more data models of the plurality of data models;
providing one or more model objects based on the traversal of the one or more data models; and
identifying the one or more discrepancies based on an execution of one or more rules, wherein the execution compares one or more threshold values in the one or more rules to resource allocation values associated with the one or more model objects.

11. The media of claim 8, further comprising:
traversing one or more data models associated with one or more customers;
traversing one or more other data models associated with one or more other customers;
executing the one or more rules to compare one or more model objects from the one or more data models and one or more other model objects from the one or more other data models; and
identifying one or more discrepancies based on one or more affirmative results of the comparison.

12. The media of claim 8, further comprising:
traversing one or more data models associated with one or more industry segments to provide one or more model objects;
executing one or more rules to compare the one or more model objects, wherein the one or more compared model objects are associated with separate industry segments; and
identifying one or more discrepancies based on one or more affirmative results of the comparison.

13. The media of claim 8, wherein identifying the one or more discrepancies based on the execution of the one or more rules, further comprises, comparing one or more resource allocation values associated with one or more model objects in a data model with a mean resource allocation value that is associated with one or more corresponding benchmark objects.

14. The media of claim 8, further comprising:
traversing the plurality of data models to identify clusters of resource allocation values associated with the one or more model objects;
identifying one or more correlations in the resource allocation values based on machine learning that includes one or more of linear regression, or deep learning neural networks; and
providing one or more additional discrepancy models based on the one or more identified correlations.

15. A network computer for identifying allocation discrepancies, comprising:
a transceiver that communicates over the network;
a memory that stores at least instructions; and
one or more processor devices that execute instructions that perform actions, including:
instantiating a resource modeling engine to perform actions, including:
providing a plurality of data models and a plurality of benchmark models to a separately instantiated analysis engine, wherein the plurality of data models are each comprised of two or more nodes and one or more edges from a memory that is configured and arranged to store the plurality of data models, and wherein each node represents a model object and each edge represents a resource allocation; and
providing one or more discrepancy models to the analysis engine, wherein each discrepancy model includes one or more rules, wherein the analysis engine is employed to search for discrepancies in the plurality of data models based on the one or more discrepancy models and the plurality of benchmark models; and
instantiating a visualization engine to use one or more discrepancies that are identified by the analysis engine to perform further actions, including:
providing one or more notifications to one or more users, wherein geolocation information based on electronic signals processed by a Global Positioning System (GPS) device is employed to improve understanding of a visual display for one or more users by modifying the visual display of the notifications based on a location of a client computer employed by the one or more users, wherein the modification includes one or more of time zone, currency, calendar format, or language and, wherein the resource modeling engine modifies the one or more discrepancy models based on subsequent feedback provided by the one or more users in the visual display and also employs the one or more of time zone, currency, calendar format, or language to modify one or more of a user interface, a report, an internal process, or a database.

16. The network computer of claim 15, wherein the one or more rules include one or more threshold conditions that correspond to a discrepancy in the plurality of data models.

17. The network computer of claim 15, further comprising:
   employing the analysis engine to traverse one or more data models of the plurality of data models;
   providing one or more model objects based on the traversal of the one or more data models; and
   identifying the one or more discrepancies based on an execution of one or more rules, wherein the execution compares one or more threshold values in the one or more rules to resource allocation values associated with the one or more model objects.

18. The network computer of claim 15, further comprising:
   traversing one or more data models associated with one or more customers;
   traversing one or more other data models associated with one or more other customers;
   executing the one or more rules to compare one or more model objects from the one or more data models and one or more other model objects from the one or more other data models; and
   identifying one or more discrepancies based on one or more affirmative results of the comparison.

19. The network computer of claim 15, further comprising:
   traversing one or more data models associated with one or more industry segments to provide one or more model objects;
   executing one or more rules to compare the one or more model objects, wherein the one or more compared model objects are associated with separate industry segments; and
   identifying one or more discrepancies based on one or more affirmative results of the comparison.

20. The network computer of claim 15, wherein identifying the one or more discrepancies based on the execution of the one or more rules, further comprises, comparing one or more resource allocation values associated with one or more model objects in a data model with a mean resource allocation value that is associated with one or more corresponding benchmark objects.

21. The network computer of claim 15, further comprising:
   traversing the plurality of data models to identify clusters of resource allocation values associated with the one or more model objects;
   identifying one or more correlations in the resource allocation values based on machine learning that includes one or more of linear regression, or deep learning neural networks; and
   providing one or more additional discrepancy models based on the one or more identified correlations.

* * * * *